United States Patent
Tsai

(10) Patent No.: US 11,609,187 B2
(45) Date of Patent: Mar. 21, 2023

(54) ARTIFICIAL NEURAL NETWORK-BASED METHOD FOR SELECTING SURFACE TYPE OF OBJECT

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 478 days.

(21) Appl. No.: 16/848,601

(22) Filed: Apr. 14, 2020

(65) Prior Publication Data

US 2020/0364889 A1 Nov. 19, 2020

Related U.S. Application Data

(60) Provisional application No. 62/848,216, filed on May 15, 2019.

(51) Int. Cl.
*G01N 21/88* (2006.01)
*G06T 7/586* (2017.01)
(Continued)

(52) U.S. Cl.
CPC ........ *G01N 21/8806* (2013.01); *G01J 3/2823* (2013.01); *G01N 21/01* (2013.01); *G01N 21/3581* (2013.01); *G01N 21/8851* (2013.01); *G01N 21/952* (2013.01); *G01N 21/956* (2013.01); *G06F 17/16* (2013.01); *G06F 18/2148* (2023.01); *G06N 3/04* (2013.01);
(Continued)

(58) Field of Classification Search
CPC ... G01J 3/2823; G01N 21/01; G01N 21/3581; G01N 21/8851; G01N 21/952; G01N 21/956; G01N 2021/8887; G01N 2021/8883; G01N 21/9515; G01N 21/8806; G06F 17/16; G06K 9/6257; G06N 3/04; G06N 3/0472; G06N 3/063; G06N 3/08; G06N 3/0454; G06T 7/0004; G06T 7/11; G06T 7/40; G06T 7/45; G06T 7/586; G06T 7/97; G06T 2207/10152; G06T 2207/20081; G06T 2207/20084; G06V 10/143; G06V 10/22; G06V 10/242; G06V 10/25; G06V 20/64; G06V 20/647; G06V 2201/06; G06V 10/145; G06V 10/60
See application file for complete search history.

(56) References Cited

U.S. PATENT DOCUMENTS 9,310,278 B2 * 4/2016 Sukegawa .............. G01N 21/57
10,255,085 B1 * 4/2019 Valsaraj ................. G06F 16/904
(Continued)

*Primary Examiner* — Xuemei G Chen

(57) ABSTRACT

An artificial neural network-based method for selecting a surface type of an object is suitable for selecting a plurality of objects. The artificial neural network-based method for selecting a surface type of an object includes performing surface type identification on a plurality of object images by using a plurality of predictive models to obtain a prediction defect rate of each of the predictive models, wherein the object images correspond to surface types of a part of the objects, and cascading the predictive models according to the respective prediction defect rates of the predictive models into an artificial neural network so as to select the remaining objects.

17 Claims, 26 Drawing Sheets

(51) Int. Cl.

| | |
|---|---|
| *G06T 7/00* | (2017.01) |
| *G06N 3/08* | (2023.01) |
| *G01N 21/3581* | (2014.01) |
| *G06T 7/40* | (2017.01) |
| *G06N 3/04* | (2023.01) |
| *G06T 7/11* | (2017.01) |
| *G01J 3/28* | (2006.01) |
| *G01N 21/956* | (2006.01) |
| *G06T 7/45* | (2017.01) |
| *G06F 17/16* | (2006.01) |
| *G06N 3/063* | (2023.01) |
| *G01N 21/01* | (2006.01) |
| *G01N 21/952* | (2006.01) |
| *G06V 10/22* | (2022.01) |
| *G06V 20/64* | (2022.01) |
| *G06F 18/214* | (2023.01) |
| *G06N 3/047* | (2023.01) |
| *G06V 10/145* | (2022.01) |

(52) U.S. Cl.
CPC ............ *G06N 3/047* (2023.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G06V 10/145* (2022.01); *G06V 10/22* (2022.01); *G06V 20/64* (2022.01); *G06V 20/647* (2022.01); *G01N 2021/8887* (2013.01); *G06T 2207/10152* (2013.01); *G06T 2207/20081* (2013.01); *G06T 2207/20084* (2013.01)

(56) References Cited

U.S. PATENT DOCUMENTS

| | | | |
|---|---|---|---|
| 10,346,969 B1* | 7/2019 | Raghu | G06V 30/19173 |
| 10,546,236 B2* | 1/2020 | Gruenstein | G06N 3/0454 |
| 10,621,779 B1 | 4/2020 | Topiwala | |
| 2003/0023404 A1* | 1/2003 | Moselhi | G01N 21/954 |
| | | | 702/181 |
| 2006/0280348 A1* | 12/2006 | Smith | G06T 7/0012 |
| | | | 382/128 |
| 2013/0077838 A1 | 3/2013 | Lamash | |
| 2013/0300608 A1* | 11/2013 | Margalef | G01S 5/0252 |
| | | | 342/451 |
| 2016/0139977 A1* | 5/2016 | Ashani | G06V 20/52 |
| | | | 714/26 |
| 2016/0148079 A1* | 5/2016 | Shen | G06V 10/454 |
| | | | 382/157 |
| 2017/0191945 A1* | 7/2017 | Zhang | G06T 3/4053 |
| 2018/0157899 A1* | 6/2018 | Xu | G06N 3/0454 |
| 2018/0268257 A1* | 9/2018 | Ren | G06N 3/04 |
| 2019/0034762 A1* | 1/2019 | Hashimoto | G06N 3/0454 |
| 2019/0138888 A1* | 5/2019 | Sekiyama | G06T 7/0012 |
| 2019/0221313 A1* | 7/2019 | Rim | A61B 3/1176 |
| 2019/0265172 A1 | 8/2019 | Koseki | |
| 2019/0278994 A1 | 9/2019 | Bu,pas | |
| 2019/0311186 A1 | 10/2019 | Chen | |
| 2019/0331608 A1* | 10/2019 | Terasawa | G03F 1/84 |
| 2019/0392363 A1* | 12/2019 | Kohli | G06Q 50/04 |
| 2020/0104650 A1* | 4/2020 | Huang | G06V 10/82 |
| 2020/0151591 A1* | 5/2020 | Li | G06N 3/08 |
| 2020/0202527 A1* | 6/2020 | Choi | A61B 8/08 |
| 2020/0292462 A1* | 9/2020 | Chen | G01N 21/95 |
| 2020/0356850 A1* | 11/2020 | Fukuda | G06N 3/0454 |
| 2020/0364850 A1 | 11/2020 | Tsai et al. | |
| 2021/0049749 A1* | 2/2021 | Machek | G06T 7/001 |
| 2021/0064927 A1* | 3/2021 | Kluckner | G06N 3/04 |
| 2021/0117651 A1* | 4/2021 | Kotake | G06V 40/174 |

\* cited by examiner

ARTIFICIAL NEURAL NETWORK-BASED METHOD FOR SELECTING SURFACE TYPE OF OBJECT

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present invention relates to an artificial neural network training system, and more particular to an artificial neural network-based method for selecting a surface type of an object.

Description of the Prior Art

Various safety protection measures are consisted of numerous small structural objects, such as safety belts. If these small structural objects have insufficient strength, safety concerns of protection effects of safety protection measures can be resulted.

Due to various reasons during a manufacturing process of these structural objects, such as impacts, fabrication errors and mold defects, minute defects such as slots, cracks, bumps and textures can be resulted on surfaces of these structural objects. These minute defects cannot be easily observed. One conventional defect detection method is manually inspecting a structural object under test by naked eye or by touching of hands, so as to determine whether the structural object contains defects, such as recesses, scratches, color differences or damages. However, manually inspecting whether a structural object contains defects yields less satisfactory efficiency and is extremely susceptible to misjudgment, leading to the problem of an unmanageable yield rate of the structural object

SUMMARY OF THE INVENTION

In one embodiment, an artificial neural network-based method for selecting a surface type of an object is suitable for selecting a plurality of objects. The artificial neural network-based method for selecting a surface type of an object includes performing surface type identification on a plurality of object images by using a plurality of predictive models to obtain a prediction defect rate of each of the predictive models, wherein the object images correspond to surface types of a part of the objects, and cascading the predictive models according to the respective prediction defect rates of the predictive models into an artificial neural network so as to select the remaining objects.

In conclusion, the artificial neural network-based method for selecting a surface type of an object according to an embodiment of the present invention cascades multiple neural networks of different training conditions according to the respective determination defect rates of the neural networks, so as to provide an artificial neural network system capable of accurately and rapidly categorizing a large amount of objects under test, while satisfying an improved miss rate.

DETAILED DESCRIPTION OF THE EMBODIMENTS

An artificial neural network-based method for selecting a surface type of an object is suitable for an artificial neural network system. Herein, the artificial neural network system can be implemented on a processor.

Figure 1:
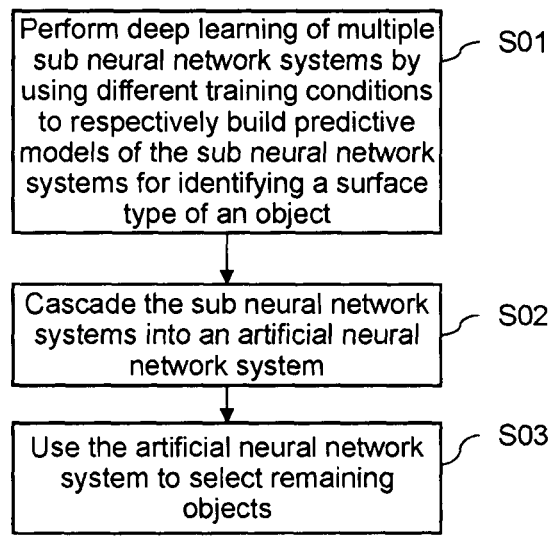
FIG. 1 is a flowchart of an artificial neural network-based method for selecting a surface type of an object according to an embodiment of the present invention.

In some embodiments, referring to FIG. 1, in a learning phase, the processor can perform deep learning of multiple sub neural network systems (equivalent artificial neural networks not yet trained) by using different training conditions so as to respectively build predictive models (equivalent to trained artificial neural networks) that the sub neural network systems use for identifying a surface type of an object image, thereby obtaining trained sub neural network systems (step S01). Herein, the object images can be images of surfaces of a same type of objects at the same relative positions. Further, the artificial neural network system receives a plurality of object images by using fixed imaging coordinate parameters. Further, the object images are obtained by capturing images of surfaces of multiple objects.

In some embodiments of step S01, at the beginning of the learning phase, the multiple sub neural network systems can adopt the same neural network algorithm but different setting parameters (e.g., different pre-processing processes, different numbers of layers, different numbers of neurons, or a combination thereof), adopt different neural network algorithms but have the same setting parameters, or adopt different neural network algorithms and different setting parameters. For example, the processor can perform one deep learning process of different setting parameters by using the same or different sets of object images to build predictive models of multiple sub neural network systems. In another example, the processor can perform multiple deep learning processes by using the same or different set of object images to build predictive models of multiple sub neural network systems.

In some embodiments, the sub neural network systems perform deep learning of different training conditions to build respective predictive models. The training conditions can be, for example, different numbers of neural network layers, different neuron configurations, different pre-processing processes of input images, different neural network algorithms, or a combination thereof. The pre-processing of images can be feature enhancement, image cropping, data format conversion, image superimposition, or any combination thereof. In some embodiments, the respective predictive model of individual sub neural network systems can be implemented by the same or different neural network algorithms. The neural network algorithm can be, for example but not limited to, a convolutional neural network (CNN).

Next, in a system creating phase, the processor cascades the trained sub neural network systems into an artificial neural network system (step S02).

Figure 2:
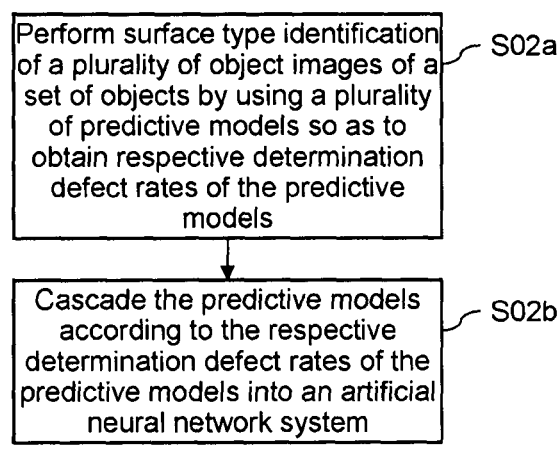
FIG. 2 is a schematic diagram of an implementation of step S02 in FIG. 1.

In an example of step S02, referring to FIG. 2, after the predictive models of the sub neural network systems have been built, the processor feeds the same set of object images to the sub neural network systems, so as to have the predictive models of the sub neural network systems individually categorize the set of object images to obtain respective determination defect rates of the predictive models (step S02a). Then, the processor cascades the predictive models according to the respective determination defect rates of the predictive models into an artificial neural network system (step S02b). In other words, surface type identification of the objects is performed individually by the trained sub neural network systems by using the same set of object images to obtain the respective determination defect rates of the sub neural network systems. Then, the processor cascades the sub neural network systems according to the respective determination defect rates of the sub neural network systems so as to obtain an artificial neural network system including multiple sub neural network systems cascaded.

Once the artificial neural network system is formed (step S02a or S02b), in an application phase, the processor can use the artificial neural network system formed to select another set of objects (step S03). In other words, the processor feeds object images of another set of objects to the artificial neural network system, for the artificial neural network system to perform categorization prediction on the object images fed thereto. For example, the processor first individually trains multiple sub neural network systems in advance. Further, the processor receives object images of multiple objects. While the artificial neural network system is being created (i.e., the system creating phase), the processor feeds the object images of a part of the objects to the trained sub neural network systems, such that the sub neural network systems select this part of objects and accordingly obtain the determination defect rates thereof. At this point, the sub neural network systems individually perform categorization prediction on the object images of this part of objects, and accordingly obtain respective determination defect rates according to the categorization. Next, the processor cascades the sub neural network systems according to the respective determination defect rates of the sub neural network systems into an artificial neural network system. Then, when the artificial neural network system is applied (i.e., the application phase), the processor feeds in the object images of the remaining objects to the artificial neural network system, so as to select the remaining objects.

Herein, the artificial neural network system cascades multiple neural networks of different training conditions according to the respective determination defect rates of the neural networks, so as to provide an artificial neural network system capable of accurately and rapidly categorizing a large number of objects under test, while satisfying an improved miss rate.

Figure 3:
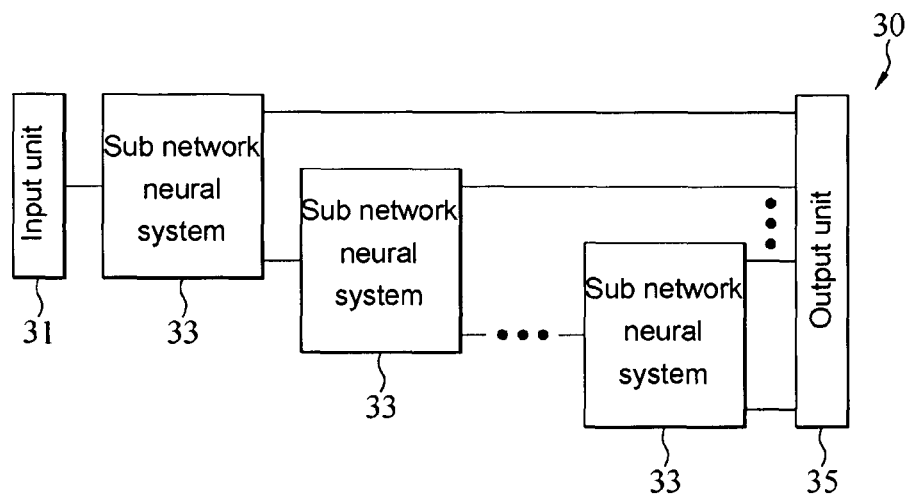
FIG. 3 is a schematic diagram of an artificial neural network system according to an embodiment of the present invention.

Referring to FIG. 3, the artificial neural network system 30 can include an input unit 31, multiple sub neural network systems 33 and an output unit 35. The sub neural network systems 33 are cascaded between the input unit 31 and the output unit 35, and each sub neural network system 30 has a part of an output thereof connected in series to the sub neural network system 33 of the next stage. Each sub neural network system 33 includes a predictive model.

In some embodiments, the output of each neural network system 33 can be divided into a normal group and an abnormal group, and the normal group of each sub neural network system 33 is connected to the input of the sub neural network system 33 of the next stage. Referring to FIG. 1 and FIG. 3, in the application phase, the object images IM fed to the artificial neural network system 30 are sequentially selected by each sub neural network system 33 (step S03). For example, in the application phase, upon feeding one or more object images IM into the artificial neural network system 30, the first-stage sub neural network system 33 executes the predictive model on the object images IM to categorize the object images IM into a first-stage normal group or a first-stage abnormal group. If the object images IM are categorized into the first-stage normal group, the object images IM outputted to the first-stage normal group by the first-stage sub neural network system 33 are subsequently fed to the second-stage sub neural network system 33, such that the second-stage sub neural network system 33 continues to execute the predictive model on the object images IM so as to categorize the object images IM into a second-stage normal group or a second-stage abnormal group. Conversely, if the object images IM are categorized into the first-stage abnormal group, the object images IM outputted to the first-stage normal group by the first-stage sub neural network system 33 are not fed to the second-stage sub neural network system 33. The above steps are similarly repeated, until the last-stage sub neural network system 33 executes the predictive model on the object images IM fed in by the previous stage (equivalent to the object images IM categorized into the normal group by the previous-stage sub neural network system 33).

In some embodiments, the output unit 35 receives the abnormal groups outputted by all the sub neural network systems 33 and accordingly outputs an abnormal result, and the output unit 35 further receives the normal group outputted by the last-stage sub neural network system 33 and accordingly outputs a normal result.

Figure 4:
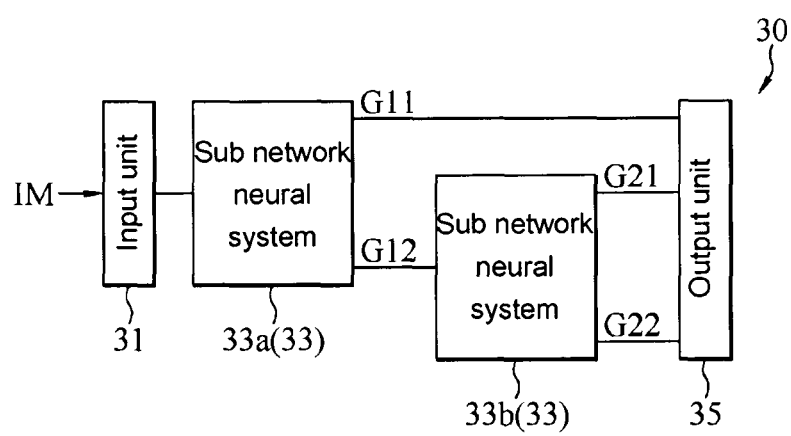
FIG. 4 is a schematic diagram of an artificial neural network system according to another embodiment of the present invention.

For illustration purposes, two sub neural network systems 33 are taken as an example; however, the exemplary quantity is not to be construed as a limitation to the present invention. Referring to FIG. 4, the two sub neural network systems 33 are respectively referred to as a first sub neural network system 33a and a second sub neural network system 33b.

The input of the first sub neural network system 33a is coupled to the input unit 31. A part of the output of the first sub neural network system 33a is coupled to the input of the second sub neural network system 33b, and the other part of the first sub neural network system 33a is coupled to the output unit 35.

Herein, the first sub neural network system 33a has a first predictive model, and the second sub neural network system 33b has a second predictive model. In some embodiments, the first predictive model can be implemented by a CNN algorithm, and the second predictive model can also be implemented by a CNN algorithm. However, the present invention is not limited to the above example.

Figure 5:
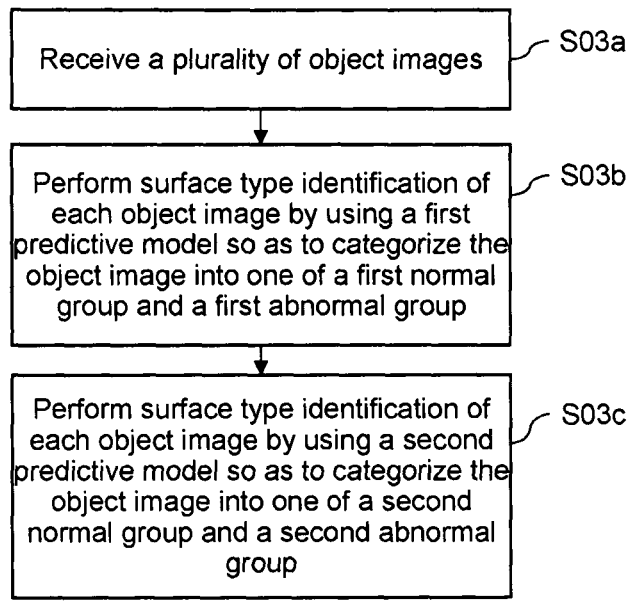
FIG. 5 is an implementation of step S03 in FIG. 1.

Herein, referring to FIG. 4 and FIG. 5, the input unit 31 receives one or multiple object images IM (step S03a), and feeds the object images IM received to the first sub neural network system 33a. Next, the first predictive model of the first sub neural network system 33a performs surface type identification on each object image IM to categorize the object image IM to one of a first normal group G12 and a first abnormal group G11 (step S03b). In other words, the first predictive model categorizes, after identifying the surface type imaged in the object image IM, the object image IM to the first normal group G12 or the first abnormal group G11.

Then, the object image IM categorized to the first normal group G12 is fed to the second sub neural network system 33b, and the second predictive model of the second sub neural network system 33b performs surface type identification so as to categorize the object image IM to one of a second normal group G22 and a second abnormal group G21 (step S03c). In other words, the second predictive model identifies the surface type imaged in the object image IM belonging to the first normal group G12, and then categorizes the object image IM according to the identification result to the second normal group G22 or the second abnormal group G21.

Finally, the output unit 35 receives the first abnormal group G11 outputted from the first predictive model, the second abnormal group G21 outputted from the second predictive model, and the second normal group G22 outputted from the second predictive model, and outputs an abnormal result and a normal result. The abnormal result includes the object image IM categorized to the first abnormal group G11 and the object image IM categorized to the second abnormal group G21. The normal result includes the object image IM categorized to the second normal group G22.

In some embodiments, the number of neural networks cascaded in the artificial neural network system 30 can be two neural networks, three neural networks, four neural networks, or even more neural networks cascaded according to actual requirements.

In some embodiments, the processor can cascade the multiple sub neural network systems 33 according to the determination defect rates of the predictive models of the multiple sub neural network systems 33 into one artificial neural network system 30. For example, the sub neural network system 33 having a higher determination defect rate is arranged in the front, and the sub neural network system 33 having a lower determination defect rate is arranged at the back. In other words, the determination defect rates of the multiple sub neural network systems 33 cascaded decrease sequentially. Therefore, in the application phase, the artificial neural network system 30 is prioritized to first select objects according to higher determination defect rates of the predictive models. On this basis, the artificial neural network system 30 is capable of rapidly performing categorization prediction on a large number of objects under test, while satisfying an improved miss rate.

Herein, if a surface of an object contains any surface type, an image of the surface type is also formed at a corresponding image position in the object image of the object. For example, if the surface of an object has a sand hole, this sand hole is also imaged at a corresponding image position in the object image of the object. If the surface of an object has a bump mark, this bump mark is also imaged at a corresponding image position in the object image of the object. In some embodiments, the surface type is, for example, surface structures such as slots, cracks, bumps, sand holes, air holes, bump marks, scratches, edges and textures and so on. Wherein, the surface structure is a three-dimensional fine structure. Herein, the three-dimensional fine structure is in a scale between submicron and micron (μm); that is, the longest side or the longest diameter of the three-dimensional fine structure is in a scale between submicron and micron. Wherein, submicron refers to <1 μm, e.g., 0.1 μm to 1 μm. For example, the three-dimensional fine structure is a microstructure of 300 nm to 6 μm.

In some embodiments, at least one of the sub neural network systems 33 can perform image pre-processing of image cutting.

Figure 6:
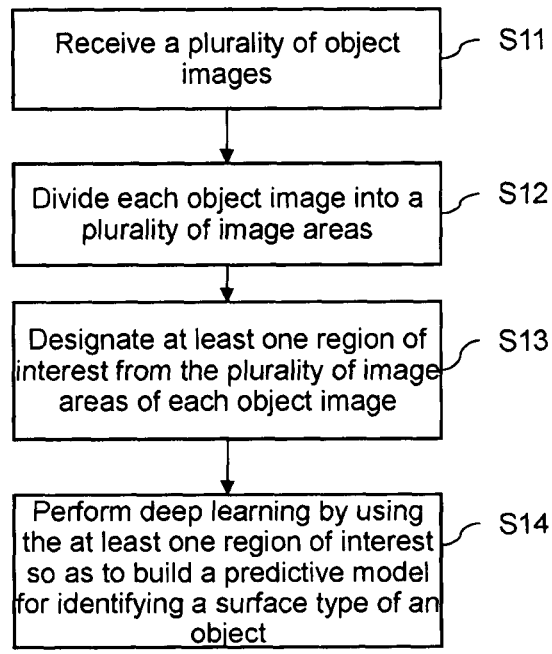
FIG. 6 is a flowchart of a training method for a sub neural network system according to a first embodiment of the present invention.

Referring to FIG. 6, in the learning phase, the sub neural network system 33 receives a plurality of object images IM (step S11). Herein, the object images can be images of surfaces of a same type of objects at the same relative positions. Next, the sub neural network system 33 divides each object image IM into a plurality of image areas (step S12), and designates at least one region of interest from the plurality of image areas of each object image IM (step S13). In other words, after an object image IM is cut into a plurality of image areas, the sub neural network system 33 can designate, according to a designation setting, an image area of a corresponding sequence among the plurality of image areas as a region of interest. Then, the sub neural network system 33 performs deep learning (training) by using the designated region of interest so as to build a predictive model for identifying a surface type of the object (step S14). In some embodiments, the sub neural network system 33 is capable of performing division, designation and training of the images one after another. In some other embodiments, the sub neural network system 33 is capable of first performing division and designation of each object image, and then performing training collectively by using all the designated regions of interest.

Figures 7, 8:
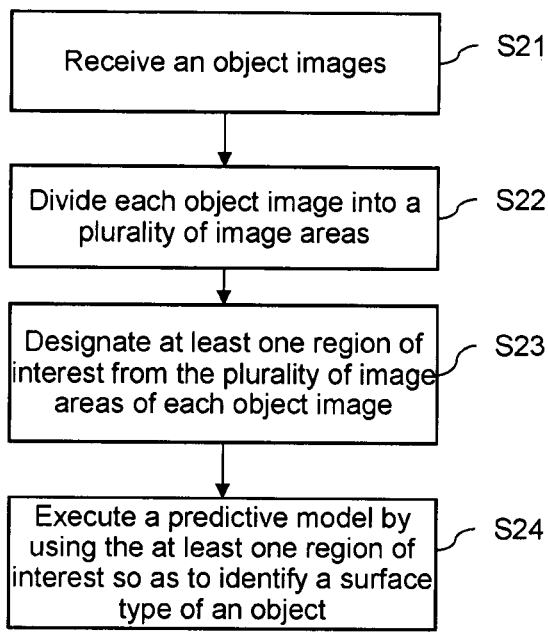
FIG. 7 is a flowchart of a prediction method for a sub neural network system according to the first embodiment of the present invention.
FIG. 8 is a schematic diagram of an example of an image area.

In a prediction phase (i.e., the system creating phase or the application phase), the sub neural network system 33 performs categorization prediction by using steps substantially the same as those in the learning phase. Referring to FIG. 7, the sub neural network system 33 receives one or multiple object images IM (step S21). Herein, the imaging target and position of each object image IM are the same as the imaging target and imaging position of the object images IM used in the learning phase (for example, the same relative positions of the same type of objects). Next, the sub neural network system 33 divides each object image IM into a plurality of image areas (step S22), and designates at least one region of interest from the plurality of image areas of each object image IM (step S23). In other words, after an object image IM is cut into a plurality of image areas, the sub neural network system 33 can designate, according to a designation setting, an image area of a corresponding sequence among the plurality of image areas as a region of interest. Then, the sub neural network system 33 executes the predictive model by using the designated region of interest so as to identify the surface type of the object (step S24).

On this basis, the sub neural network system 33 is capable of flexibly introducing a detection result of a specific region (the designated region of interest). In some embodiments, the sub neural network system 33 is capable of obtaining a lower miss rate, for example, a missing rate approximating zero.

In some embodiments, the number of divided image areas of each object image IM is any integer more than 2. Preferably, the image size of each image area can be less than or equal to 768*768 pixels, for example, 400*400 pixels, 416*416 pixels, or 608*608 pixels. Further, the image sizes of the image areas are the same. In some embodiments, each image area is preferably a square. For example, assuming the image size of the object image is 3000*4000 pixels, the image size of the image areas after cutting can be 200*200 pixels.

In some embodiments of step S12 (or step S22), the sub neural network system 33 can first cut the object image IM according to a predetermined cutting size, such that the size of the object image IM is an integer multiple of the size of the image area. Then, the sub neural network system 33 cuts the enlarged object image IM into multiple image areas according to the predetermined cutting size. Herein, the image sizes of the individual image areas are the same, that is, similarly the predetermined cutting size.

For example, referring to FIG. 8, the sub neural network system 33 individually divides each object image IM received into 70 image areas A01 to A70 by a same cutting size. Then, the sub neural network system 33 designates the image areas A01 to A10 as regions of interest according to a predetermined designation setting (assuming that the designation setting is 1 to 10), so as to further perform deep learning or execute predictive model by using the image areas A01 to A10 (i.e., the regions of interest).

In some embodiments, the region of interest can be, for example, an image area imaged from an area with sand holes of different depths, an image area imaged from an area without sand holes but having bump marks or scratches, an image area imaged from an area with different levels of surface roughness, an image area imaged from an area without surface defects, or an image area imaged from an area with defects of different aspect ratios. Herein, the sub neural network system 33 performs deep learning or executes the predictive model according to the regions of interest of different surface types. In the learning phase, the sub neural network system 33 can categorize regions of interest of different surface types so as to generate different predetermined surface type categories in advance.

For example, the sub neural network system 33 can use the regions of interest to identify that, sand holes and bump marks are imaged in the region of interest A01, no defects are imaged in the region of interest A02, only sand holes are imaged in the region of interest A33 and the level of surface roughness thereof is less than the level of surface roughness of the region of interest A35. Then, in the prediction phase, taking five categories as predetermined surface type categories for example, namely, having sand holes or air holes, having scratches or bump marks, having a high level of surface roughness, having a low level of surface roughness, and without any surface defects, the sub neural network system 33 can categorize the region of interest A01 to the predetermined category of having sand holes or air holes and the predetermined category of having scratches or bump marks, categorize the region of interest A02 to the predetermined category of without any surface defects, categorize the region of interest A33 to the predetermined category of having sand holes and air holes and the predetermined category of having a low level of surface roughness, and categorize the region of interest A35 to the predetermined category of having a high level of surface roughness.

In one embodiment of step S13 (or step S23), for each object image IM, the sub neural network system 33 designates a region of interest by changing the weighting of each image area. For instance, in continuation of the example above, referring to FIG. 8, after the object image IM is cut into multiple image areas A01 to A70, weightings of the multiple image areas A01 to A70 are initially set to 1. In one embodiment, assuming that the designation setting is 1 to 5, 33 to 38 and 66 to 70, the sub neural network system 33 increases the weightings of the image areas A1 to A5, A33 to A38 and A66 to A70 to 2 according to the predetermined designation setting, thereby designating the image areas A1 to A5, A33 to A38 and A66 to A70 as regions of interest. In one embodiment, when the weightings of the regions of interest are increased, the weightings of the other image areas A6 to A32 and A39 to A65 can be kept at 1. In another example, when the weightings of the regions of interest are increased, the sub neural network system 33 can at the same time decrease the weightings of the other image areas A6 to A32 and A39 to A65 to 0.

In another embodiment, assuming that the designation setting is 1 to 5, 33 to 38 and 66 to 70, the sub neural network system 33 decreases the weightings of the image areas A6 to A32 and A39 to A65 other than the image areas A1 to A5, A33 to A38 and A66 to A70 to 0 to 0.5 according to the predetermined designation setting, and keeps the weightings of the image areas A1 to A5, A33 to A38 and A66 to A70 at 1, thereby designating the image areas A1 to A5, A33 to A38 and A66 to A70 as regions of interest.

In one embodiment, the sub neural network system 33 can include a pre-processing unit and a deep learning unit. The input of the pre-processing unit is coupled to a previous stage (the previous sub neural network system 33 or input unit 31) of the current sub neural network system 33, and the output of the pre-processing unit is coupled to the input of the deep learning unit. The output of the deep learning unit is coupled to the next stage (the next sub neural network system 33 or output unit 35) of the current sub neural network system 33. Herein, the pre-processing unit is for performing step S11 to step S13 or step S21 to step S23, and the deep learning unit is for performing step S14 or step S24. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, step S11 to step S13 or step S21 to step S23 can be performed by the input layer instead.

In some embodiments, at least one of the sub neural network systems 33 can perform image pre-processing of data format conversion.

Figure 9:
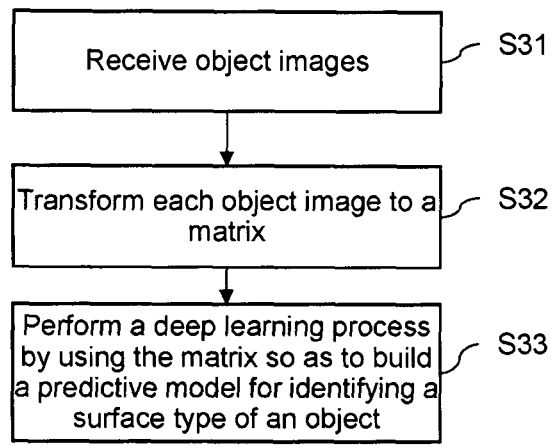
FIG. 9 is a flowchart of a training method for a sub neural network system according to a second embodiment of the present invention.

Referring to FIG. 9, in the learning phase, the sub neural network system 33 receives a plurality of object images IM (step S31). Next, the sub neural network system 33 transforms the object image IM into a matrix according to the color mode of the object image IM (step S32), that is, converting the data format of the object image to a format (i.e., an image matrix) supported by an input channel of an artificial neural network. Then, the sub neural network system 33 performs deep learning by using the matrix so as to build a predictive model for identifying a surface type of an object (step S33).

Herein, the object images IM received are all images of surfaces of the same type of objects at the same relative positions. The object images IM received have a plurality of color modes, and each object image IM has one of the color modes. In some embodiments, the color modes can include a plurality of spectra different from one another. For example, in the learning phase, the processor can feed in a large amount of object images IM to the sub neural network system 33. The object images IM fed in include surface images (i.e., object images IM) of different spectra of each object 2 of the same type of objects 2 at the same relative positions.

Herein, the artificial neural network in the sub neural network system 33 includes a plurality of image matrix input channels for inputting corresponding matrices, and the image matrix input channels respectively represent a plurality of imaging conditions (e.g., respectively representing a plurality of color modes). That is to say, the sub neural network system 33 converts the object images IM of various different color modes to information such as length, width, pixel type, pixel depth and quantity of channels in the matrix, wherein the quantity of channels represent an imaging condition corresponding to the object images. In addition, the transformed matrix is fed to the corresponding image matrix input channel according to the color mode of the object image, so as to facilitate deep learning. In some embodiments, the image matrix input channels respectively represent a plurality of spectra different from one another.

In some embodiments, the plurality of spectra can range between 380 nm and 3000 nm. For example, the plurality of spectra different from one another can be visible light of more than any one type from any of white light, violet light, blue light, green light, yellow light, orange light and red light. In one embodiment, the light wavelength of white light ranges between 380 nm and 780 nm, the light wavelength of violet light ranges between 380 nm and 450 nm, the light wavelength of blue light ranges between 450 nm and 495 nm, the light wavelength of green light ranges between 495 nm and 570 nm, the light wavelength of yellow light ranges between 570 nm and 590 nm, the light wavelength of orange light ranges between 590 nm and 620 nm, and the light wavelength of red light ranges between 620 nm and 780 nm. In another example, the spectrum can also be far infrared light having a light wavelength ranging between 800 nm and 3000 nm.

In some embodiments, the color modes can further include a grayscale mode. At this point, the object image IM is first transformed to a grayscale image, and then transformed to a matrix having the number of channels representing grayscale.

Figure 10:
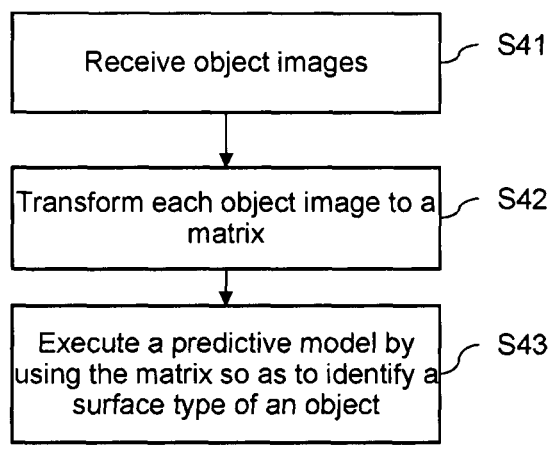
FIG. 10 is a flowchart of a prediction method for a sub neural network system according to the second embodiment of the present invention.

In the prediction phase, the sub neural network system 33 performs categorization prediction by using steps substantially the same as those in the learning phase. Referring to FIG. 10, the sub neural network system 33 receives one or more object images IM (step S41). Herein, the object images IM are images of surfaces of the same type of objects at same relative positions, and each has a specific color mode. Next, the sub neural network system 33 transforms the object image IM to a matrix according to the color mode of the object image IM (step S42). Then, the sub neural network system 33 executes the predictive mode by a matrix to identify a surface type of the object (step S43).

In some embodiments, the sub neural network system 33 can first normalize the object image IM, thus reducing asymmetry between learning data and at the same time enhancing learning efficiency. Then, the sub neural network system 33 transforms the normalized object image IM to a matrix.

On this basis, the sub neural network system 33 performs deep learning by a matrix having the number of channels representing different color modes, such that the predictive model built is capable of identifying information such as a structure type and surface texture (i.e., a surface type) on the surface 21 of the object 2. In other words, by controlling a light emitting spectrum or a light receiving spectrum to provide object images with different imaging effects, differentiation of the sub neural network system 33 with respect to various target surface types can be enhanced. In some embodiments, the sub neural network system 33 can integrate images of multi-spectrum surface textures, so as to improve identification for a target surface type of an object, thereby further obtaining surface roughness and fine texture patterns of the object.

In one embodiment, the sub neural network system 33 can include a pre-processing unit and a deep learning unit. The input of the pre-processing unit is coupled to a previous stage (the previous sub neural network system 33 or input unit 31) of the current sub neural network system 33, and the output of the pre-processing unit is coupled to the input of the deep learning unit. The output of the deep learning unit is coupled to the next stage (the next sub neural network system 33 or output unit 35) of the current sub neural network system 33. Herein, the pre-processing unit is for performing step S31 and step S32 or step S41 and step S42, and the deep learning unit is for performing step S33 or step S43. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, step S31 and step S32 or step S41 and step S42 can be performed by the input layer instead.

In some embodiments, at least one of the sub neural network systems 33 can perform image pre-processing of image superimposition.

Figure 11:
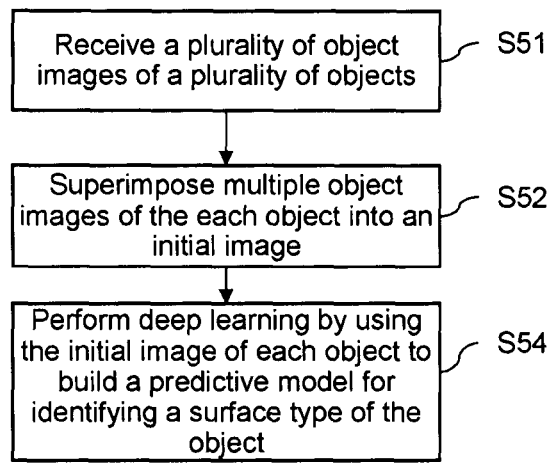
FIG. 11 is a flowchart of a training method for a sub neural network system according to a third embodiment of the present invention.

In one embodiment, referring to FIG. 11, in the learning phase, the sub neural network system 33 receives a plurality of object images IM of a plurality of objects (step S51). These object images IM are images of surfaces of the same type of objects at the same relative positions. The plurality of object images IM of the same object are images of the object captured on the basis of light from different lighting directions. In one example, the images of the same object captured can have the same spectrum or can have multiple different spectra. Next, the sub neural network system 33 superimposes the multiple object images IM of the objects into a superimposed object image (to be referred to as an initial image hereafter) (step S52). Then, the sub neural network system 33 performs deep learning by using the initial images of the objects to build a predictive model for identifying a surface type of an object (step S54). For example, the object images IM receive include multiple object images IM of a first object and multiple object images IM of a second object. The sub neural network system 33 superimposes the multiple object images IM of the first object into an initial image of the first object, and superimposes the multiple object images IM of the second object into an initial image of the second object, and then performs deep learning by using the initial image of the first object and the initial image of the second object.

Figure 12:
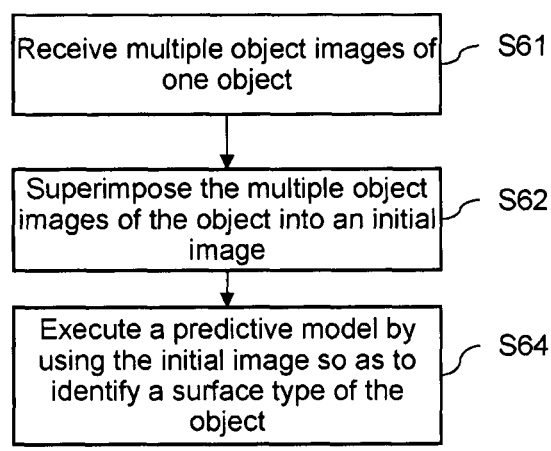
FIG. 12 is a flowchart of a prediction method for a sub neural network system according to the third embodiment of the present invention.

In the prediction phase, the sub neural network system 33 performs categorization prediction by using steps substantially the same as those in the learning phase. Referring to FIG. 12, the sub neural network system 33 receives one or more object images IM of an object (step S61). Herein, the multiple object images IM of the object are images of a surface of the object at the same relative positions. Further, the multiple object images IM of the object are images of the object captured on the basis of light from different lighting directions. Next, the sub neural network system 33 superimposes the multiple object images IM of the object into an initial image (step S62). Then, the sub neural network system 33 executes the predictive model by the initial image to identify a surface type of the object (step S64).

On this basis, the sub neural network system 33 can perform training by using multi-angle imaging (i.e., different lighting directions) collaborating with pre-processing of multi-dimensional superimposition, so as to enhance identification for stereoscopic structural features of an object, given that the computation time is not increased. In other words, by controlling different incident angles of an imaging light source, the same object is provided with object images having different imaging effects, thereby enhancing the spatial stereoscopic differentiation of the sub neural network system 33 with respect to various surface types of an object. Further, by integrating object images under different lighting directions, multi-dimensional superimposition is performed on the object images, so as to enhance identification of the sub neural network system 33 with respect to surface types of an object, thereby obtaining an optimal resolution of surface types of an object.

In an example of step S52 (or step S62), the superimposition means adding up brightness values of the pixels in the object image IM.

Figure 13:
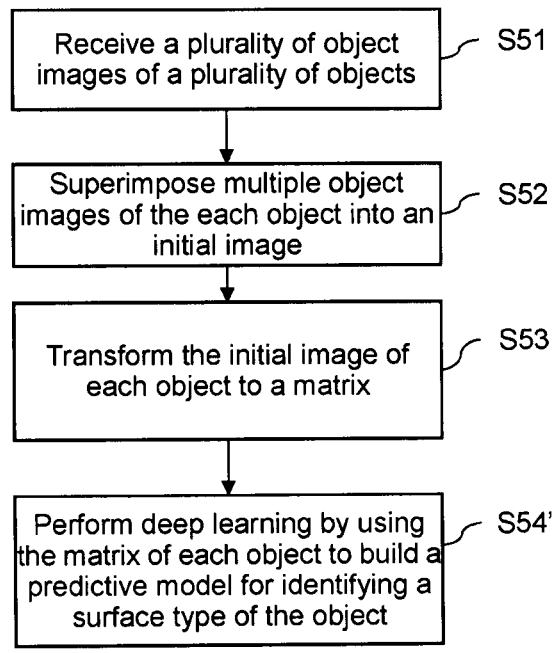
FIG. 13 is a flowchart of a training method for a sub neural network system according to a fourth embodiment of the present invention.
Figure 14:
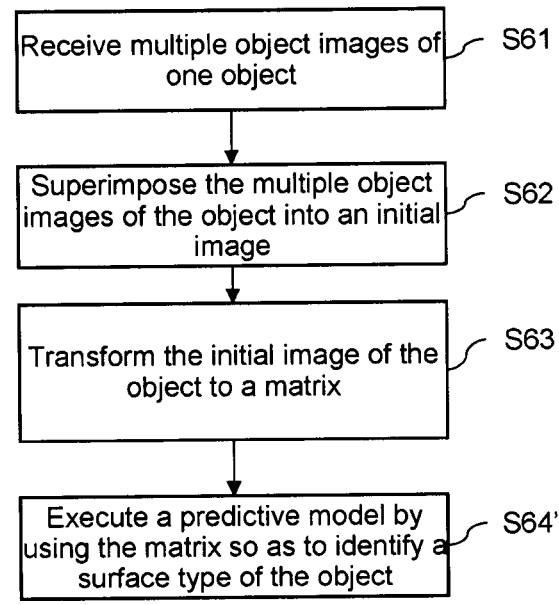
FIG. 14 is a flowchart of a prediction method for a sub neural network system according to the fourth embodiment of the present invention.

In another embodiment, referring to FIG. 13 or FIG. 14, after step S52 or S62, the sub neural network system 33 can first transform the initial image of each object to a matrix (step S53 or S63); that is, the data format of the initial image of each transformed object image is a format (e.g., an image matrix) supported by the input channel of an artificial neural network. Then, the sub neural network system 33 performs deep learning or executes the predictive model by using the matrix of each object (step S54' or S64'). That is to say, the sub neural network system 33 converts the initial image of each object into information such as length, width, pixel type, pixel depth and quantity of channels in the matrix, wherein the quantity of channels represents the color mode corresponding to the initial image. Further, the transformed matrix is fed to the corresponding image matrix input channel according to the color mode of the initial image, so as to facilitate subsequent processing.

In an example of step S52 (or step S62), the sub neural network system 33 first normalizes the object image IM received, and then superimposes the normalized object images IM of the same object into the initial image. Thus, asymmetry between learning data is reduced and learning efficiency is enhanced.

In one example of step S51 (or step S61), the object images IM of the same object can have the same spectrum. In another example of step S51 (or step S61), the object images IM of the same object can have a plurality of different spectra. That is to say, the multiple object images IM of the same object includes an image of the object captured on the basis of a spectrum of different lighting directions and an image of the object captured on the basis of another spectrum of different lighting directions. Further, the two spectra are different from each other.

In one embodiment, the sub neural network system 33 can include a pre-processing unit and a deep learning unit. The input of the pre-processing unit is coupled to a previous stage (the previous sub neural network system 33 or input unit 31) of the current sub neural network system 33, and the output of the pre-processing unit is coupled to the input of the deep learning unit. The output of the deep learning unit is coupled to the next stage (the next sub neural network system 33 or output unit 35) of the current sub neural network system 33. Herein, the pre-processing unit is for performing step S51 to step S53 or step S61 to step S63, and the deep learning unit is for performing step S54, step S54', step S64 or step S64'. In other words, the deep learning unit becomes the predictive model upon having performed deep learning. In another embodiment, the deep learning unit can include an input layer and multiple layers of hidden layers. The input layer is coupled between the previous stage (the previous sub neural network system 33 or input unit 31) and the hidden layers. Each hidden layer is coupled between the input layer and the next stage (the next sub neural network system 33 or output unit 35). Herein, steps S51 to step S53 or step S61 to step S63 can be performed by the input layer instead.

Figure 15:
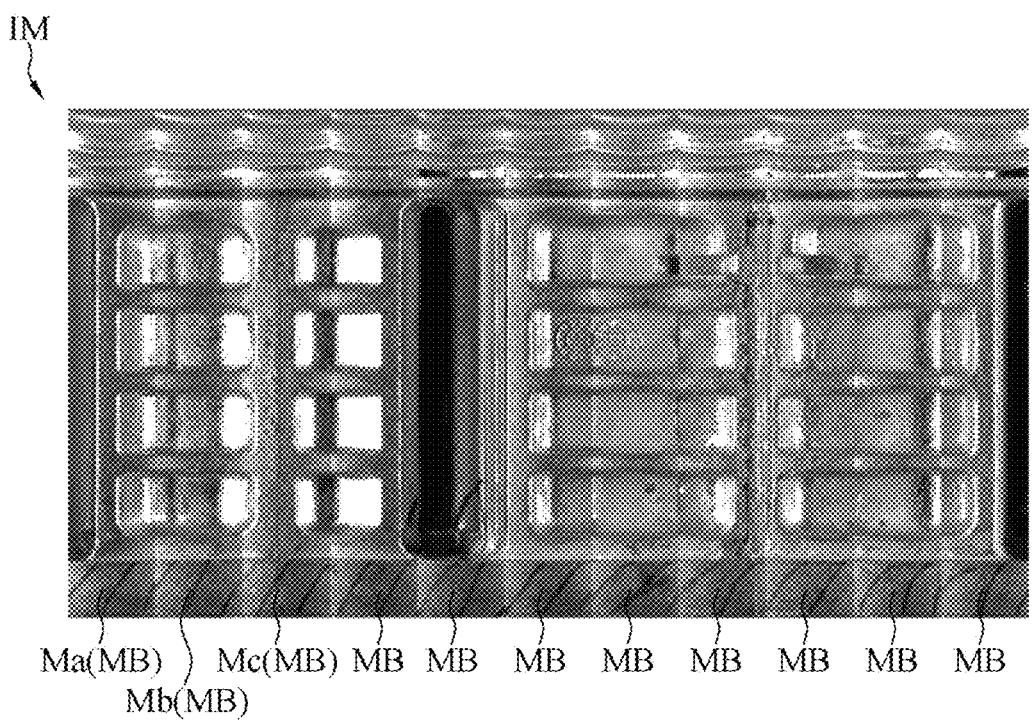
FIG. 15 is a schematic diagram of an example of an object image.

In some embodiments, each object image IM is combined from a plurality of detection images MB (as shown in FIG. 15). In one example, the image size of the region of interest is smaller than the image size of the detection image (the original image size).

In some embodiments, each detection image MB can be generated by performing image scanning on the object 2 by an image scanning system for a surface type of an object.

Figure 16:
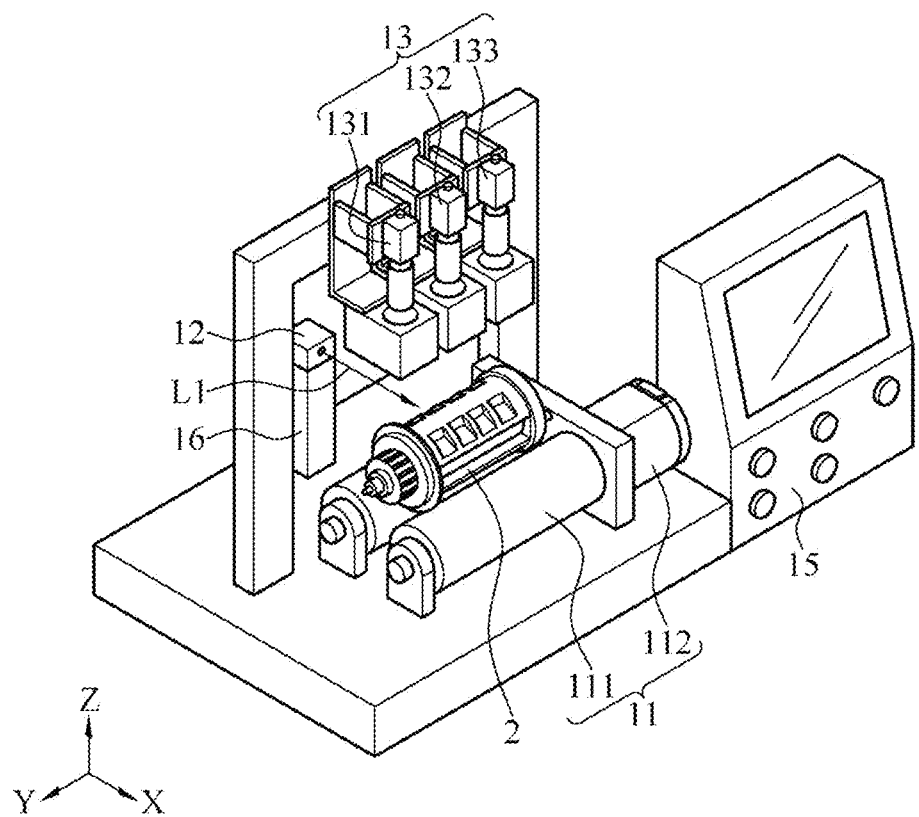
FIG. 16 is a schematic diagram of an image scanning system for a surface type of an object according to the first embodiment of the present invention.

Referring to FIG. 16, the image scanning system for a surface type of an object is suitable for scanning the object 2 to obtain at least one detection image MB of the object 2. Herein, the object 2 has a surface 21, and the surface 21 of the object 2 is divided along an extension direction D1 of the surface 21 of the object 2 into a plurality of areas 21A to 21C. In some embodiment, assuming that the surface 21 of the object 2 is divided into nine areas for example, three exemplary areas 21A to 21C are denoted in the drawings. However, the present invention is not limited to the above example. The surface 21 of the object 2 can also be divided into areas of other quantities according to actual requirements, for example, any quantity such as 3, 5, 11, 15 or 20.

Referring to FIG. 16 to FIG. 19, FIG. 18 and FIG. 19 show two implementations of relative optical positions of the object 2, the light source component 12 and the photosensitive element 13 in FIG. 16. The image scanning system for a surface type of an object includes a driver component 11, the light source component 12 and the photosensitive element 13. The light source 12 and the photosensitive element 13 face a detection position 14 on the driver component 11 by different angles.

The image scanning system can perform an image capturing procedure. Referring to FIG. 16 to FIG. 20, in the image capturing procedure, the driver component 11 carries the object 2 under test and sequentially moves one of the plurality of areas 21A to 21C to the detection position 14 (step S110). Further, the light source component 12 emits light L1 toward the detection position 14 (step S120), so as to providing light in a forward or lateral direction toward the detection position 14. Thus, the areas 21A to 21C are sequentially provided at the detection position 14, and receive illumination of the light L1 from a lateral or inclined direction when located at the detection position 14.

In some embodiments, when each of the areas 21A to 21C is located at the detection position 14, the photosensitive element 13 receives diffused light generated by the light received on the areas on the surface at the detection position 14, and captures, according to the diffused light received, detection images of the areas sequentially located at the detection position 14 (step S130).

In some embodiments, the image detection scanning system further includes a processor 15. The processor 15 is coupled to the light source component 12, the photosensitive element 13 and a driver motor 112, and is for controlling operations of the components (e.g., the light source component 12, the photosensitive element 13 and the driver motor 112).

In some embodiments, upon having captured the detection images MB of all the areas 21A to 21C of the object 2 by the photosensitive element 13, the processor 15 can further perform a combination process according to the detection images MB to obtain the object image IM of the object 2 (step S140).

For example, in the image capturing procedure, the driver component 11 first moves the area 21A to the detection position 14, and the photosensitive element 13 captures, as the area 21A is illuminated by the detection light L1 provided by the light source component 12, a detection image Ma of the area 21A, as shown in FIG. 15. Next, the driver component 11 moves object 2 to locate the area 21B to the detection position 14, and the photosensitive element 13 captures, as the area 21B is illuminated by the detection light L1 provided by the light source component 12, a detection image Mb of the area 21B, as shown in FIG. 15. Next, the driver component 11 moves the object 2 to locate the area 21C to the detection position 14, and the photosensitive element 13 captures, as the area 21C is illuminated by the detection light L1 provided by the light source component 12, a detection image Mc of the area 21C, as shown in FIG. 15. The above is performed similarly, until the detection images MB of all areas have been captured. Then, the processor 15 combines the detection images MB into an object image IM, as shown in FIG. 15.

In some embodiment, more specifically, in the image capturing procedure, the object 2 is carried on the driver component 11, and one of the areas 21A to 21C of the object 2 is substantially located at the detection position 14. Herein, each time before image capturing is performed, the image scanning system performs alignment once (i.e., fine tuning the position of the object 2), so as to align the area to a viewing angle of the photosensitive element 13.

Figure 21:
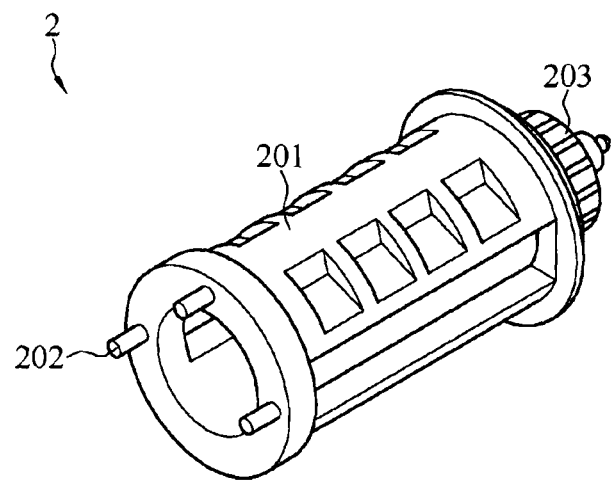
FIG. 21 is a schematic diagram of an example of an object.
Figure 22:
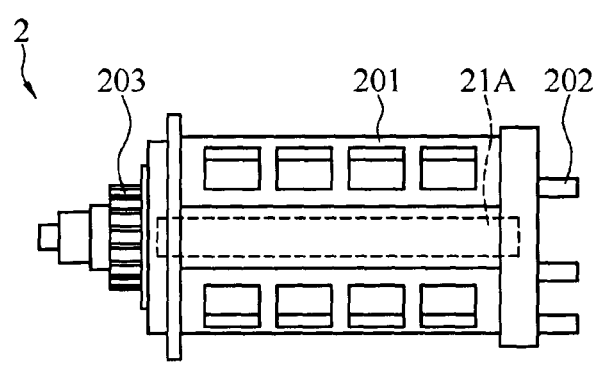
FIG. 22 is a top view of the object in FIG. 21.

In some embodiments, referring to FIG. 21 and FIG. 22, the object 2 includes a body 201, a plurality of first alignment structures 202 and a plurality of second alignment structures 203. The first alignment structures 202 are located on one end of the body 201, and the second alignment structures 203 are located on the other end of the body 201. In some embodiments, the first alignment structures 202 can be structures such as columns, bumps or slots; the second alignment structures 203 can be structures such as columns, bumps or slots. In some embodiments, the second alignment structures 203 are arranged at intervals along the extension direction (to be referred to as a first direction D1 hereafter) of the surface 21 of the body 201, and the distance between any two adjacent second alignment structures 203 is more than or equal to a viewing angle of the photosensitive element 13. In some embodiments, the second alignment structures 203 respectively correspond to the areas 21A to 21C of the object 2. Each of the second alignment structures 203 is aligned to the middle of the side of the corresponding area along the first direction D1.

The first alignment structures 202 are exemplified by columns (to be referred to as alignment columns hereafter), and the second structures 203 are exemplified by slots (to be referred to as alignment slots hereafter) in the description below. In some embodiments, the extension direction of each alignment column is substantially identical to the extension direction of the body 201, and one end of each column is coupled to one end of the body 201. The alignment slots are located on the other end of the body 201, and encircle the body 201 by regarding the long axis of the body 201 as a rotation axis and are arranged at intervals on surface of the other end of the body 201.

In some embodiments, the first alignment structures 202 are arranged at intervals on the body 201. In this example, three first alignment structures 202 are taken as an example; however, the present invention is not limited to the quantity above. By viewing the side of the body 201 from the top, when rotated by regarding the long axis of the body 201 as a rotation axis, the first alignment structures 202 present different relative positions; for example, the first alignment structures 202 are arranged at intervals in a non-overlapping manner (as shown in FIG. 22), or any two first alignment structures 202 overlap but the remaining one first alignment structure 202 does not overlap.

In some embodiments, referring to FIG. 16 to FIG. 19 as well as FIG. 21 to FIG. 24, in the image capturing procedure, under the lighting of the light source component 12, the processor 15 controls the photosensitive element 13 to capture a test image of the object 2 (step S211). Herein, the test image includes an image block of the second alignment structure 203 currently facing the photosensitive element 13.

The processor 15 detects a presentation position of the image block presenting the second alignment structure 203 in the test image (step S212), so as to determine whether the area currently located at the detection position 14 is aligned to the viewing angle of the photosensitive element 13.

When the presentation position of the image block is not located in the middle of the test image, the processor 15 controls the driver component 11 to fine tune the position of the object 2 in the first direction D1 (step S213), and subsequently iterates step S211. Herein, step S211 to step S213 are repeatedly performed until the processor 15 detects that the presentation position of the image block is located in the middle of the test image.

When the presentation position of the image block is located in the middle of the test image, the processor 15 drives the photosensitive element 13 to perform image capturing; at this point, under the lighting of the light source component 12, the photosensitive element 13 captures a detection image of the area of the object 2 (step S214).

Next, the processor 15 controls the driver component 11 to move the next area of the object 2 in the first direction to the detection position 14, so as to have the next second alignment structure 203 face the photosensitive element 13 (step S215), and subsequently iterates step S211. Herein, step S211 to step S215 are repeatedly performed until the detection images of all the areas of the object 2 have been captured. In some embodiments, an amplitude by which the driver component 11 fine tunes the object 2 is less than an amplitude by which it moves the next area of the object 2.

On this basis, the image scanning system can analyze specific structures of the object in the test image by using the image to determine whether the object is aligned, thereby obtaining an image aligned to the viewing angle of the photosensitive element 13.

For example, assume that the object 2 has three areas, and the photosensitive element 13 faces the area 21A of the object 2 at the beginning of the image capturing procedure. At this point, under the lighting of the light source component 12, the photosensitive element 13 first captures a test image (to be referred to as a first test image hereafter) of the object 2. The first test image includes an image block (to be referred to as a first image block hereafter) presenting the second alignment structure 202 corresponding to the area 21A. Next, the processor 15 performs image analysis of the first test image to detect a presentation position of the first image block in the first test image. When the presentation position of the first image block is not located in the middle of the first test image, the driver component 11 fine tunes the position of the object 2 in the first direction D1. After fine-tuning, the photosensitive element 13 again captures the first test image for the processor 15 to determine whether the presentation position of the first image block is located in the middle of the first test image. Conversely, when the presentation position of the first image block is located in the middle of the first test image, the photosensitive element 13 captures, under the lighting of the light source component 12, the detection image of the area 21A of the object 2. After capturing, the driver component 11 moves the next area 21B of the object 2 in the first direction D1 to the detection position 14, so as to have the second alignment structure 203 corresponding to the area 21B face the photosensitive element 13. Next, under the lighting of the light source component 12, the photosensitive element 13 again captures the test image (to be referred to as a second test image hereafter) of the object 2, wherein the second test image includes an image block (to be referred to as a second image block hereafter) presenting the second alignment structure 203 corresponding to the area 21B. Next, the processor 15 performs image analysis of the second test image to detect the presentation position of the second image block in the second test image. When the presentation position of the second image block is not located in the middle of the second test image, the driver component 11 fine tunes the position of the object 2 in the first direction D1. After fine-tuning, the photosensitive element 13 again captures the second test image for the processor 15 to determine whether the presentation position of the second image block is located in the middle of the second test image. Conversely, when the presentation position of the second image block is located in the middle of the second test image, the photosensitive element 13 captures, under the lighting of the light source component 12, the detection image of the area 21B of the object 2. After capturing, the driver component 11 moves the next area 21C of the object 2 in the first direction D1 to the detection position 14, so as to have the second alignment structure 203 corresponding to the area 21C face the photosensitive element 13. Next, under the lighting of the light source component 12, the photosensitive element 13 again captures the test image (to be referred to as a third test image hereafter) of the object 2, wherein the third test image includes an image block (to be referred to as a third image block hereafter) presenting the second alignment structure 203 corresponding to the area 21C. Next, the processor 15 performs image analysis of the third test image to detect the presentation position of the third image block in the third test image. When the presentation position of the third image block is not located in the middle of the third test image, the driver component 11 fine tunes the position of the object 2 in the first direction D1. After fine-tuning, the photosensitive element 13 again captures the third test image for the processor 15 to determine whether the presentation position of the third image block is located in the middle of the third test image. Conversely, when the presentation position of the third image block is located in the middle of the third test image, the photosensitive element 13 captures, under the lighting of the light source component 12, the detection image of the area 21C of the object 2.

In some embodiments, when the image scanning system needs to capture an image of an object 2 by using two different image capturing parameters, the image scanning system performs the image capturing procedure once by sequentially using one image capturing parameter. The different image capturing parameters can provide the light source component 12 with light L1 of different brightness levels, enable the light source component 12 to provide lighting with different light incident angles, or provide the light source component 12 with light L1 having different spectra.

Figure 23:
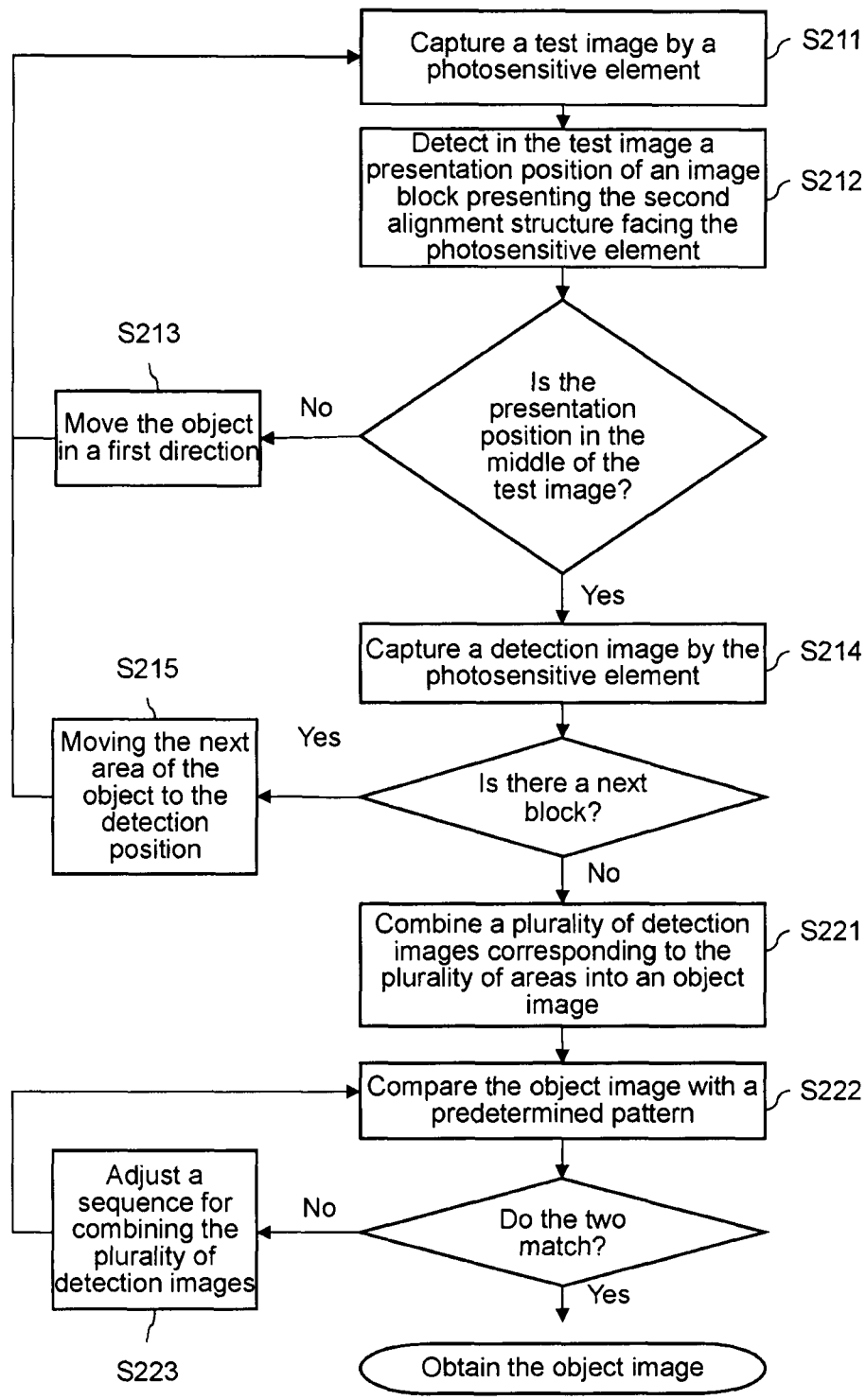
FIG. 23 is a flowchart of an image scanning method for a surface type of an object according to the second embodiment of the present invention.

In some embodiments, referring to FIG. 23, upon having captured the detection images of all the areas 21A to 21C of the object 2, the processor 15 combines the detection images of the all of the areas 21A of the object 2 to 21C according to a capturing sequence into an object image (step S221), and compares the combined object image with a predetermined pattern (step S222). If the object image does not match the predetermined pattern, the processor 15 adjusts a sequence of combining the detection images (step S223), and again performs the step of comparing (step S222). Conversely, if the object image matches the predetermined pattern, the processor 15 obtains the object image of the object 2.

In some embodiments, the image scanning system can further perform a position regulation procedure. After the object 2 is placed on the driver component 11, the image scanning system performs the position regulation procedure to regulate the position of the object to thereby determine a position at which the object 2 is located at the time when image capturing begins.

Figure 24:
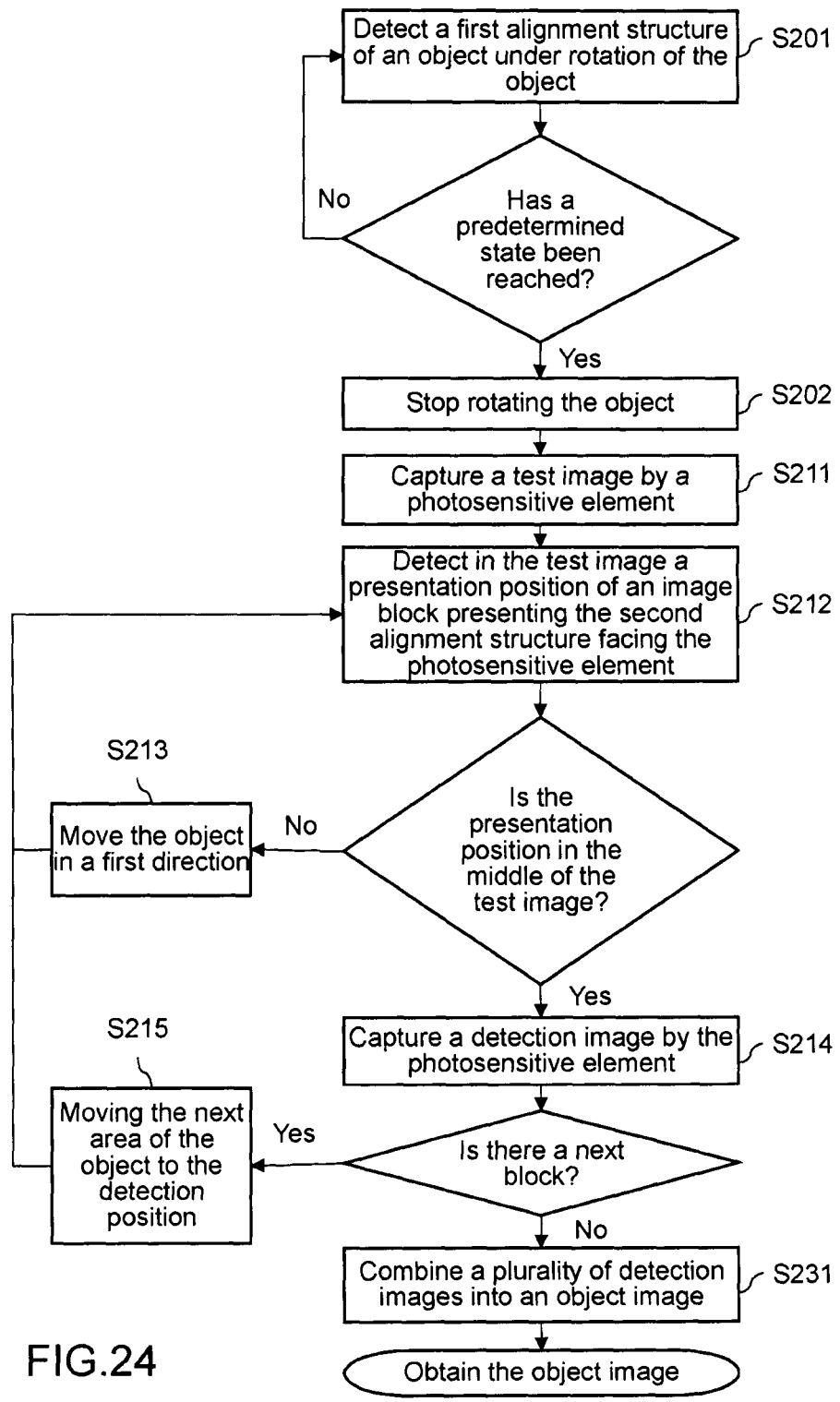
FIG. 24 is a flowchart of an image scanning method for a surface type of an object according to the third embodiment of the present invention.

Referring to FIG. 24, in the position regulation procedure, the driver component 11 continuously rotates the object 2, and under rotation of the object 2, the processor 15 detects the first alignment structures 202 of the object 2 by using the photosensitive element 13 (step S201), so as to determine whether the first alignment structures 202 have reached a predetermined state. Herein, during the rotation of the object 2, the second alignment structures 203 of the object 2 sequentially face the photosensitive element 13.

In some embodiments, the predetermined state can be relative positions of the first alignment structures 202, and/or a brightness relationship of the image blocks of the first alignment structures 202.

In one example, under the rotation of the object 2, the photosensitive element 13 continuously captures the detection image of the object 2, wherein the detection image includes the image block presenting the first alignment structures 202. The processor 15 analyzes each of the detection images to determine the relative positions among the image blocks of the first alignment structures 202 in the detection image, and/or the brightness relationship of the image blocks of the first alignment structures 202 in the detection image. For example, the processor 15 analyzes the detection image and discovers that, the image blocks of the first alignment structures 202 are spaced from one another and are non-overlapping and the brightness of the middle image block among the image blocks of the first alignment structures 202 is higher than the brightness of the second image blocks on the two sides; at this point, the processor 15 determines that the first alignment structures 202 have reached the predetermined state. In other words, the predetermined state is set by image features of a predetermined structure of the object 2.

When the first alignment structures 202 have reached the predetermined state, the processor 15 stops rotating the object (step S202) and performs the image capturing procedure of the object. That is, the processor 15 controls the driver component 11 to stop rotating the object 2. Conversely, capturing of the detection image is continued and an imaging position and/or an imaging state of the image blocks of the first alignment structures are/is analyzed.

On this basis, the image scanning system can analyze presentation forms and presentation positions of specific structures of the object in the test images by using images to determine whether the object is aligned, thereby capturing, according to the aligned object, the detection images of the areas located at the same position.

In some embodiments, if the image scanning system includes a position regulation procedure, upon having captured the detection images of all the areas 21A to 21C of the object 2, the processor 15 can combine, according to a capturing sequence, the detection images captured into an object image of the object 2 (step S231).

For instance, taking the spindle shown in FIG. 21 and FIG. 22 for example, after the image scanning system performs the image capturing procedure (that is, repeating step S211 to S215), the photosensitive element 13 can capture detection images MB of all the areas 21A to 21C. Herein, the processor 15 an combine the detection images MB of all the areas 21A to 21C according to the capturing sequence into an object image IM of the object 2, as shown in FIG. 15. In this example, the photosensitive element 13 can be a linear photosensitive element. At this point, the detection images MB captured by the photosensitive element 13 can be combined by the processor 15 without any cropping. In some embodiments, the linear photosensitive element can be implemented by a linear image sensor. Wherein, the linear image sensor can have a field of view (FOV) of approximately 0 degree.

Figure 25:
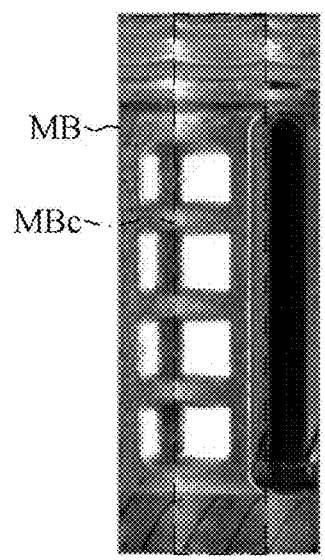
FIG. 25 is a schematic diagram of an example of a detection image.

In another embodiment, the photosensitive element 13 is a two-dimensional photosensitive element. At this point, upon having captured the detection images MB of all the areas 21A to 21C by the photosensitive element 13, the processor 15 captures, based on the short sides of the detection images MB, middle regions MBc of the detection images MB, as shown in FIG. 25. Then, the processor 15 combines the middle regions MBc corresponding to all the areas 21A to 21C into the object image IM. In some embodiments, the middle sections MBc can have a width of, for example, one pixel. In some embodiments, the two-dimensional photosensitive element can be implemented by a planar image sensor. Wherein, the planar image sensor can have a field of view of approximately 5 degrees to 30 degrees.

In some embodiments, the image scanning system can further include a test procedure. In other words, before the position regulation procedure and the image capturing procedure are performed, the image scanning system can first perform a test procedure, so as to confirm that all the components (e.g., the driver component 11, the light source component 12 and the photosensitive element 13) are functional.

Figure 26:
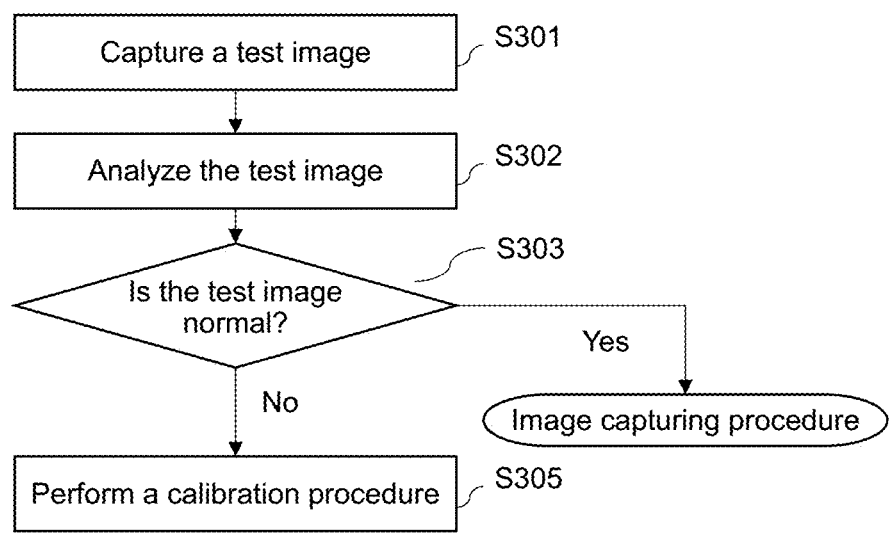
FIG. 26 is a partial flowchart of an image scanning method for a surface type of an object according to some embodiments of the present invention.

In the test procedure, referring to FIG. 26, the photosensitive element 13 captures, under the lighting of the light source component 12, a test image (step S301). The processor 15 receives the test image captured by the photosensitive element 13, and the processor 15 analyzes the test image (step S302) to determine whether the test image is normal (step S303) and then accordingly determines whether the test is complete. If the test image is normal (a determination result of "yes"), it means that the photosensitive element 13 can capture a normal detection image in step S301 of the detection procedure, and at this point, the image scanning system continues to the position regulation procedure (continuing to perform step S201) or continues to perform the image capturing procedure (continuing to perform step S211).

If the test image is abnormal (a determination result of "no"), the image scanning system can perform a calibration procedure (step S305).

Figure 17:
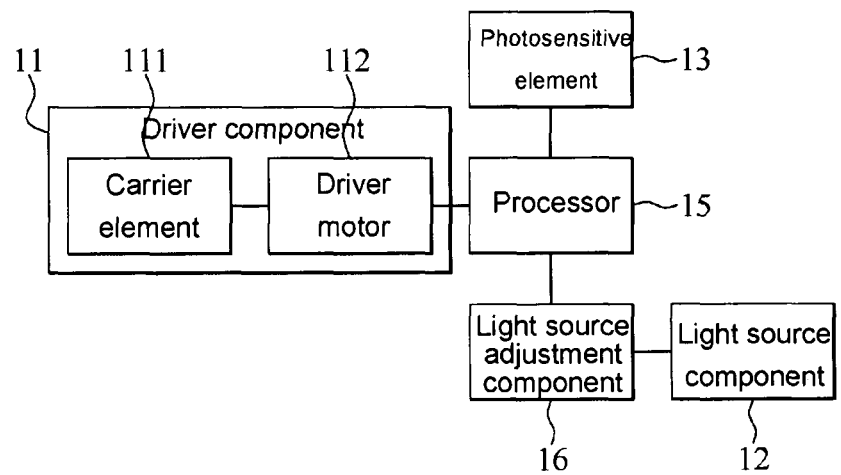
FIG. 17 is a function schematic diagram of an image scanning system for a surface type of an object according to an embodiment of the present invention.

In some embodiments, referring to FIG. 16 and FIG. 17, the image scanning system can further include a light source adjustment component 16, which is coupled to the light source component 12 and the processor 15. Herein, the light source adjustment component 16 can be used for adjusting the position of the light source component 12 so as to change a light incident angle θ.

In one example, referring to FIG. 16, FIG. 17 and FIG. 26, the photosensitive element 13 can capture an area currently located at the detection position 14 as a test image (step S301). At this point, the processor 15 analyzes the test image (step S302) to determine whether average brightness of the test image satisfies predetermined brightness to determine whether the test image is normal (step S303). If the average brightness level of the test image does not satisfy the predetermined brightness (a determination result of "no"), it means that the test image is abnormal. For example, when the light incident angle θ of the light source component 12 is inappropriate, the average brightness of the test image does not satisfy the predetermined brightness; at this point, the test image cannot correctly present a predetermined surface type of the object 2 expected to be detected.

During the calibration procedure, the processor 15 controls the light source adjustment component 16 to again adjust the position of the light source component 12 and again set the light incident angle θ (step S305). After the light source adjustment component 16 again adjusts the position of the light source component 12 (step S305), the light source component 12 emits another test light having a different light incident angle θ. At this point, the processor 15 controls the photosensitive element 13 to capture, according to the another test light, an image of an area current located at the detection position 14 to generate another test image (step S301), and the processor 15 can analyze the another test image (step S302) to determine whether the average brightness of the another test image satisfies the predetermined brightness (step S303). If the brightness of the another test light still does not satisfy the predetermined brightness (a determination result of "no"), the processor 15 controls the light source adjustment component 16 to again adjust the position of the light source component 12 and again adjust the light incident angle θ (step S301), until the average brightness of the test image captured by the photosensitive element 13 satisfies the predetermined brightness. If the average brightness of the test image satisfies the predetermined brightness (a determination result of "yes"), the image scanning system continues to subsequent step S201 or S211 to perform the position regulation procedure or the image capturing procedure.

Figure 27:
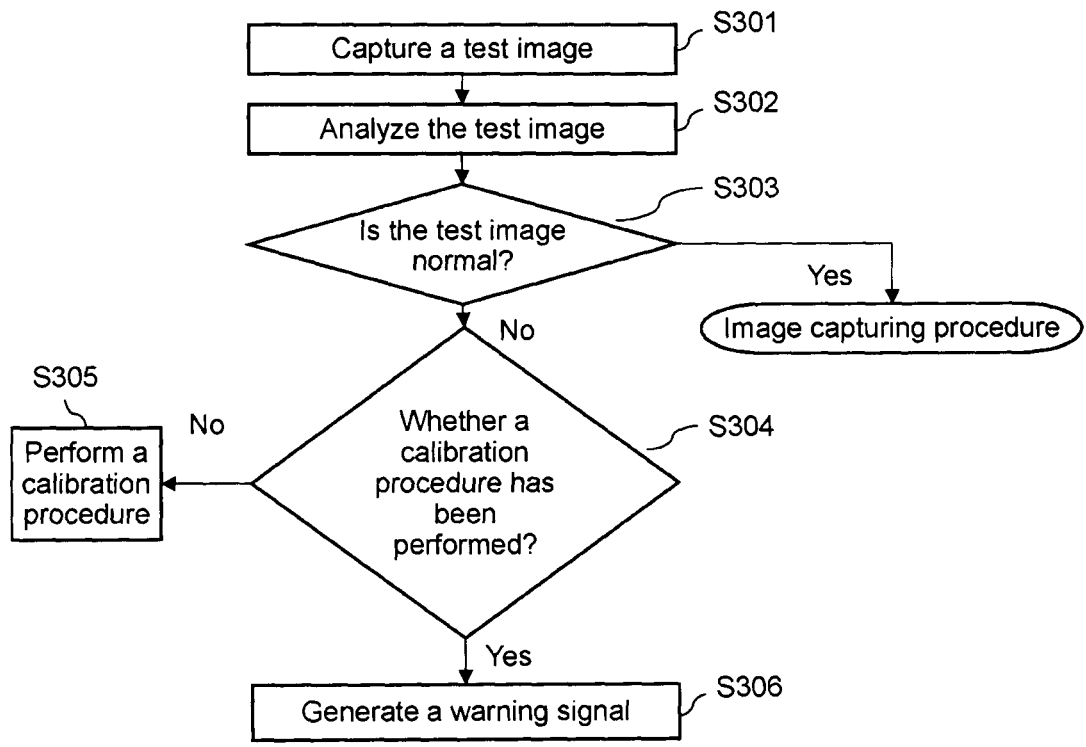
FIG. 27 is a partial flowchart of an image scanning method for a surface type of an object according to some other embodiments of the present invention.

In another embodiment, referring to FIG. 16, FIG. 17 and FIG. 27, the processor 15 can also determine according to the test image whether a setting parameter of the photosensitive element 13 is normal (step S303). If the test image is normal (a determination result of "yes"), it means that the setting parameter of the photosensitive element 13 is normal, and the image scanning system continues to subsequent step S201 or S211 to perform the position regulation procedure or the image capturing procedure. If the test image is abnormal (a determination result of "no"), it means that the setting parameter of the photosensitive element 13 is abnormal, and the processor 15 further determines whether the photosensitive element 13 has performed a calibration operation of the setting parameter thereof (step S304). If the photosensitive element 13 has performed the calibration operation of the setting parameter thereof (a determination result of "yes"), the processor 15 generates a warning signal indicating that the photosensitive element 13 is abnormal (step S306). If the photosensitive element 13 has not yet performed the calibration operation of the setting parameter thereof (a determination result of "no"), the image scanning system then enters the calibration procedure described above (step S305). The processor 15 drives the photosensitive element 13 to perform the calibration operation of the setting parameter thereof in the calibration procedure (step S305). After the photosensitive element 13 has performed the calibration operation (step S305), the photosensitive element 13 captures another test image (step S301), and the processor 15 again determines whether the another test image captured after the photosensitive element 13 has performed the calibration operation is normal (step S303). If the processor 15 determines that the another test image is still abnormal (a determination result of "no"), the processor 15 next determines in step S304 that the photosensitive element 13 has performed the calibration operation (a determination result of "yes"), and the processor 15 generates the warning signal indicating that the photosensitive element 13 is abnormal (step S306).

In some embodiments, the setting parameter of the photosensitive element 13 includes a photosensitivity value, an exposure value, a focal length value, a contrast setting value, or any combination thereof. In some embodiments, the processor 15 can determine whether average brightness or contrast of the test image satisfies predetermined brightness to accordingly determine whether the above-mentioned setting parameters are normal. For example, if the average brightness of the test image does not satisfy the predetermined brightness, it means that one of the setting parameters of the photosensitive element 13 is incorrect, which renders the average brightness of contrast of the test image to not satisfy the predetermined brightness; if the average brightness or contrast of the test image satisfies the predetermined brightness, it means the every one of the setting parameters of the photosensitive element 13 is correct.

In some embodiments, the image scanning system can further include an audio/video display unit; the warning signal can include video, audio, or audio and video, and the audio/video display unit can display the warning signal. Further, the image scanning system can also have a networking function, and the processor 15 can send the warning signal by the networking function to a cloud terminal for storage or send the warning signal to another device by the networking function, such that the cloud terminal or a user of the another device learns that the photosensitive element 13 is abnormal to further debug the photosensitive element 13.

In one embodiment, in the calibration procedure (step S305), the photosensitive element 13 automatically adjusts the setting parameters in the calibration procedure according to a parameter configuration file. Herein, the parameter configuration file stores setting parameters of the photosensitive element 13. In some embodiments, an inspector can update the parameter configuration file such that the photosensitive element 13 automatically adjusts the parameters according to the parameter configuration file automatically updated in the calibration procedure, so as to correct any incorrect setting parameter.

In the foregoing embodiment, while the photosensitive element 13 captures an image (i.e., the test image or the detection image), the light source component 12 emits light L1 toward the detection position 14, and the light L1 illuminates the area current located at the detection position 14 from an inclined direction or a lateral direction.

Figure 18:
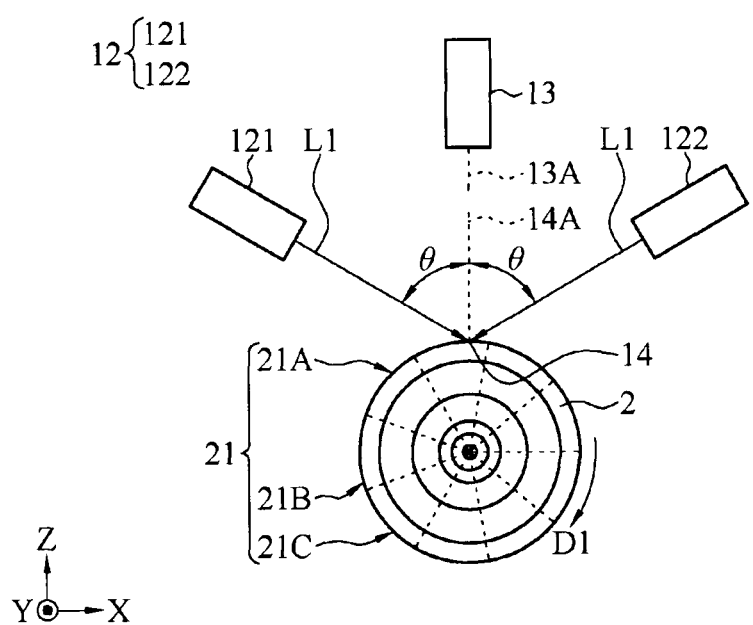
FIG. 18 is a schematic diagram of a first implementation of relative optical positions of the object, the light source component and the photosensitive element in FIG. 16.
Figure 19:
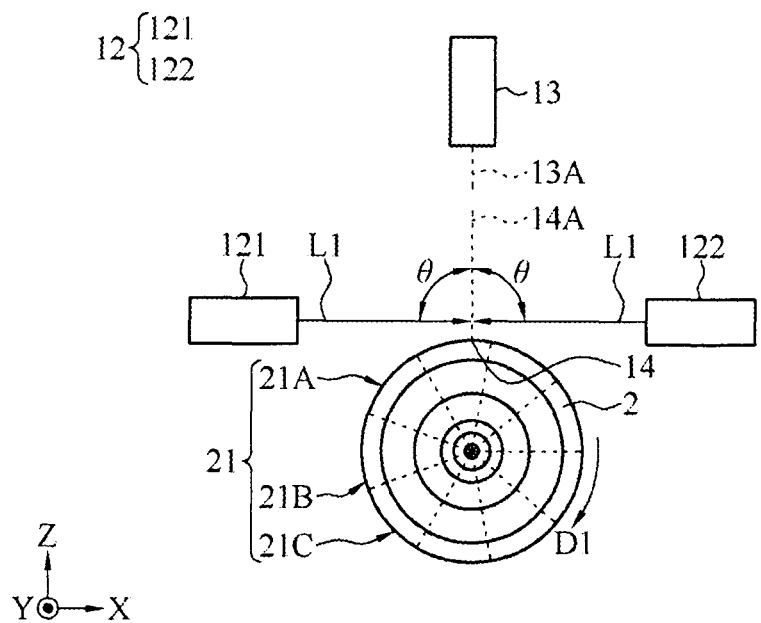
FIG. 19 is a schematic diagram of a second implementation of relative optical positions of the object, the light source component and the photosensitive element in FIG. 16.

Referring to FIG. 18 and FIG. 19, the light incident direction of the light L1 and a normal line 14A of the area located at the detection position 14 form an included angle (to be referred to as a light incident angle θ hereafter). That is, at the light incident end, an included angle between the optical axis of the light L1 and the normal line 14A is the light incident angle θ. In some embodiments, the light incident angle θ is more than 0 degree and less than or equal to 90 degrees; that is to say, the detection light L1 illuminates the detection position 14 with the light incident angle θ of more than 0 degree and less than or 90 degrees relative to the normal line 14A, such that the area current located at the detection position 14A is illuminated by the detection light L1 from a lateral direction or an inclined direction.

Figure 20:
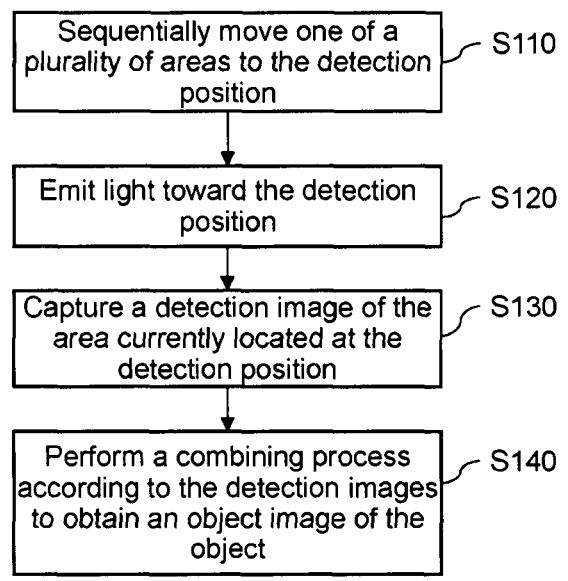
FIG. 20 is a flowchart of an image scanning method for a surface type of an object according to the first embodiment of the present invention.

In some embodiments, as shown in FIG. 18 and FIG. 19, a photosensitive axis 13A of the photosensitive element 13 is parallel to the normal line 14A; alternatively, as shown in FIG. 20, the photosensitive axis 13A of the photosensitive element 13A is between the normal line 14A and the extension direction D1, i.e., an included angle (to be referred to as a light reflection angle α) is present between the photosensitive axis 13A of the photosensitive element 13 and the normal line 14A (to be referred to as a light reflection angle α hereafter). The photosensitive element 13 receives diffused light generated from the light received on the areas 21A to 21C, and the photosensitive element 13 captures, according to the diffused light, the detection images of the areas 21A to 21C sequentially located at the detection position 14 (step S130 or step S214).

In some embodiments, according to the light incident angle θ of more than 0 degree and less than or equal to 90 degrees, that is, according to the detection light L1 that is laterally incident or incident at an inclination, if the surface 21 of the object 2 includes a grooved or holed surface structure, the detection light L1 cannot illuminate the bottom of the surface structure and the surface structure appears as a shadow in the image detection images of the areas 21A to 21C, hence forming detection images having apparent contrast between the surface 21 and a surface defect. Thus, the image scanning system or an inspector can determine whether the surface 21 of the object 2 includes a defect according to the whether the detection image includes a shadow.

In some embodiments, according to different light incident angles θ, surface structures having different depths also present different brightness levels in the detection image. More specifically, as shown in FIG. 19, when the light incident angle θ is 90 degrees, the incident direction of the light L1 is perpendicular to the depth direction of a surface structure, i.e., the optical axis of the light L1 overlaps the tangent of the surface located in the middle of the detection position. At this point, regardless of the depth of the surface structure, the surface structure on the surface 21 is not illuminated by the detection light L1 due to being recessed and hence does not produce any reflected light or diffused light; that is, surface structures with deeper or shallower depths both present shadows in the detection image, such that the detection image has less obvious contrast or even nearly no contrast. As shown in FIG. 18, when the light incident angle θ is less than 90 degrees, the incident direction of the detection light L1 is not perpendicular to the depth direction of the surface structure. At this point, the detection light L1 illuminates partial regions of the surface structure below the surface 21, and the partial regions of the surface structure receive illumination of the detection light L1 and produce reflected light and diffused light. Thus, the photosensitive element 13 receives the reflected light and diffused light from the partial regions of the surface structure, and surface structures present images with brighter borders (borders of protruding defects, for example) or darker borders (borders of recessed defects, for example) in the detection image, such that the detection image has better contrast.

Moreover, in a situation where the same light incident angle θ is less than 90 degrees, the photosensitive element 13 receives more reflected light and diffused light from shallower surface structures than from deeper surface structures. Thus, compared to a surface structure having a greater depth-width ratio, a shallower surface structure presents a brighter image in the detection image. Further, in a situation wherein the light incident angle θ is less than 90 degrees, as the light incident angle θ gets smaller, more reflected light and diffused light are produced in the surface structures, the surface structures present brighter images in the detection image, and the brightness presented by a shallower surface structure in the detection image is also greater than the brightness presented by a deeper surface structure in the image detection. For example, compared to a detection image corresponding to the 60-degree light incident angle θ, a surface structure presents higher brightness in a detection image corresponding to the 30-degree light incident angle θ. In addition, in the detection image corresponding to the 30-degree light incident angle θ, a shallower surface structure presents higher brightness in the detection image compared to a deeper surface structure.

On this basis, the value of the light incident angle θ and the brightness presented by a surface structure in a detection image have a negative correlation relationship. As the light incident angle θ gets smaller, a shallower surface structure presents a brighter image in a detection image; that is to say, in a situation where the light incident angle θ is smaller, it become more difficult for the image scanning system or the inspector to identify a shallower surface structure. In other words, it is easier for the image scanning system or the inspector to identify a deeper surface structure according to a darker image. Conversely, as the light incident angle θ becomes larger, both a deeper surface structure and a shallower surface structure present darker images in a detection image; that is to say, the image scanning system or the inspector is capable of identifying all surface structures in a situation where the light incident angle θ is larger.

Hence, the image scanning system or the inspector can set the corresponding light incident angle θ according to a predetermined hole depth of a predetermined surface structure expected to be detected and the described negative correlation relationship. For example, if detection for a predetermined deeper surface structure but not a predetermined shallower surface structure is desired, the light source adjustment component 16 can adjust the position of the light source component 12 according to the light incident angle θ calculated by using the described negative correlation relationship and thus set a smaller light incident angle θ. Further, the light source adjustment component 16 drives the light source component 12 to output the detection light L1, such that the predetermined shallower surface structure presents a brighter image in the detection image and the predetermined deeper surface structure presents a darker image in the detection image. If detection for both predetermined shallower and deeper surface structures is desired, the light source adjustment component 16 can adjust the position of the light source component 12 according to the light incident angle θ calculated by using the described negative correlation relationship and thus set a larger light incident angle θ (e.g., 90 degrees). Further, the light source adjustment component 16 drives the light source component 12 to output the detection light L1, such that the predetermined shallower and deeper surface structures both present shadows in the detection image.

For example, assuming that the object 2 is applied as a spindle of a safety belt component of an automobile, the foregoing surface structure can be a sand hole or an air hole caused by dust or air during the manufacturing process of the object 2, or a bump mark or a scratch, wherein the depth of the sand hole or the air hole is greater than that of the bump mark or the scratch. If detection for determining whether the object 2 contains sand holes or air holes is desired but detection for determining whether the object 2 contains bump marks or scratches is not needed, the light source adjustment component 16 can adjust the position of the light source component 12 according to the light incident angle θ calculated by using the described negative correlation relationship and thus set a smaller light incident angle θ, such that a sand hole or an air hole presents lower brightness in the detection image, whereas a bump mark or a scratch presents higher brightness in the detection image, and the image scanning system or the inspector can quickly identify whether the object 2 contains sand holes or air holes. If detection for determining whether the object 2 contains bump marks, scratches, sand holes and air holes is desired, the light source adjustment component 16 can adjust the position of the light source component 12 according to the light incident angle θ calculated by using the described negative correlation relationship and thus set a larger light incident angle θ, such that bump marks, scratches, sand holes and air holes all present shadows in the detection image.

Figure 29:
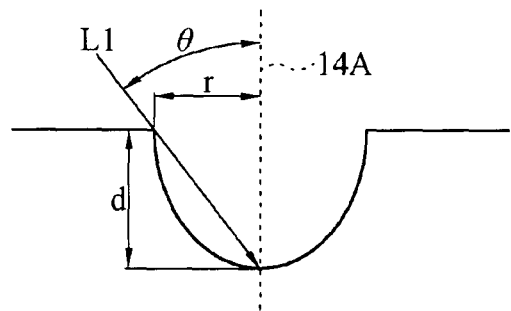
FIG. 29 is a schematic diagram of an implementation of a surface type.

In some embodiments, the light incident angle θ can be more than or equal to a critical angle and less than or equal to 90 degrees, so as to achieve capturing effects of optimal target features under the wavelength at which detection is to be performed. Herein, the critical angle can be associated with the surface type expected to be detected. In some embodiments, the light incident angle θ is associated with a predetermined aspect ratio of a predetermined surface defect to be detected. Referring to FIG. 29, taking a predetermined surface defect having a predetermined hole depth d and a predetermined hole radius r for example, the predetermined hole radius r is the distance between any lateral surface within the predetermined surface defect and the normal line 14A, and a ratio (r/d) of the predetermined hole radius r to the predetermined hole depth d is the aspect ratio (r/d) stated above, and the light incident angle θ is the arctangent (r/d). On this basis, the light source adjustment component 16 can adjust the position of the light source component 12 according to the aspect ratio (r/d) of the predetermined surface defect to be detected and thus set the light incident angle θ in step S03, wherein the light incident angle θ needs to satisfy the conditions of being equal to or more than the arctangent (r/d) and less than or equal to 90 degrees, and the light source adjustment component 16 drives the light source component 12 to output the detection light L1 after adjusting the position of the light source component 12 In some embodiments, the predetermined hole radius r can be set in advance according to the size of the surface structure expected to be detected at the object 2.

In one embodiment, the processor 15 can calculate the light incident angle θ according to the foregoing negative correlation relationship and the arctangent (r/d), and the processor 15 then drives the light source adjustment component 16 to adjust the position of the light source component 12 according to the light incident angle θ calculated.

In some embodiments, the light wavelength of the light L1 provided by the light source component 12 can range between 300 nm and 3000 nm. For example, the light wavelength of the light L1 can be within an optical waveband of 300 nm to 600 nm, 600 nm to 900 nm, 900 nm to 1200 nm, 1200 nm to 1500 nm, 1500 nm to 1800 nm, or 1800 nm to 2100 nm. In one example, the light L1 provided by the light source component 12 can be visible light. Herein, the light L1 allows an image of a surface defect in a scale of submicron (μm) on the surface 21 to form in the detection image. In some embodiments, the light wavelength of the light L1 can range between 380 nm and 780 nm, and can be determined according to requirements of the material properties and surface spectral reflectivity of the material under test. In some embodiments, the light L1 can be visible light from any of white light, violet light, blue light, green light, yellow light, orange light and red light. In one embodiment, the light wavelength of white light ranges between 380 nm and 780 nm, the light wavelength of violet light ranges between 380 nm and 450 nm, the light wavelength of blue light ranges between 450 nm and 495 nm, the light wavelength of green light ranges between 495 nm and 570 nm, the light wavelength of yellow light ranges between 570 nm and 590 nm, the light wavelength of orange light ranges between 590 nm and 620 nm, and the light wavelength of red light ranges between 620 nm and 780 nm.

In some embodiments, the light L1 provided by the light source component 12 can be far infrared light (for example, having a light wavelength thereof ranging between 800 nm and 3000 nm). Thus, the detection light L1 can allow an image of a surface type in a scale of submicron (e.g., 300 µm) on the surface of the object 2 to form in the detection image. In one example, when far infrared light is provided by the light source component 12 to illuminate light in an inclined direction on the object 2 having a surface attachment, the far infrared light is capable of passing through the surface of the object 2, enabling the photosensitive element 13 to capture the surface image of the object 2 under the attachment. In other words, the far infrared light is capable of passing through the surface attachment of the object 2, enabling the photosensitive element 13 to obtain an image of the surface 21 of the object 2. In some embodiments, the light wavelength of the far infrared light is more than 2 µm. In some embodiments, the light wavelength of the far infrared light is more than the thickness of the attachment. In other words, the wavelength of the far infrared light can be selected according to the thickness of an attachment needing to be passed through. In some embodiments, the wavelength of the far infrared light can also be selected according to the surface type of the object under test, thereby performing image filtering for micron (µm) structures. For example, if the surface of a sample has a small and long scratch or sand hole of 1 µm to 3 µm, which however does not affect the product quality, and structural defects that quality control staff are concerned about are structural defects of more than 10 µm, the wavelength of the far infrared light L1 selected can be an intermediate wavelength (e.g., 4 µm) so as to achieve optimal filtering effects for micron structure images and low-noise image quality without affecting the detection for defects in larger sizes. Preferably, the light wavelength of the far infrared light is more than 3.5 µm. In some embodiments, the object 2 is preferably a metal material. In some embodiments, the attachment can be grease, stains, or color paint.

In one embodiment, the processor 15 can drive the light source adjustment component 16 to adjust the light intensity of the far infrared light L1 emitted from the light source component 12, so as to alleviate the issue of glare and further improve the quality of detection images captured by the photosensitive element 13, thereby obtaining low-disturbance penetrating images.

For example, the light source adjustment component 16 can reduce the light intensity, enabling the photosensitive element 13 to obtain a detection image with less glare.

In another embodiment, according to different light incident angles θ, surface defects present different levels of brightness in a detection image, and the intensity of glare produced by the far infrared light L1 also changes. In other words, the processor 15 can drive the light source adjustment component 16 to adjust the light incident angle θ of the far infrared light L1 emitted from the light source component 12, so as to effectively reduce glare and further improve the quality of detection images captured by the photosensitive element 13, thereby obtaining low-disturbance penetrating images.

In yet another embodiment, the light source component adjustment component 16 can determine a polarization direction of light waves of the far infrared light L1 emitted from the light source component 12, which is equivalently controlling the light source component 12 to output polarized detection far infrared light L1, so as to effective reduce glare and further improve the quality of detection images captured by the photosensitive element 13, thereby obtaining low-disturbance penetrating images.

In some embodiments, the light source adjustment component 16 can achieve adjustment of the light incident angle θ of the light source component 12 by using a driver motor. The driver motor can be a step motor.

In some embodiments, the light source adjustment component 16 can include a driver circuit, and adjustment of light intensity of the light L1 of the light source component 12 can be achieved by changing the size of the voltage provided to the light source component 12.

Figure 30:
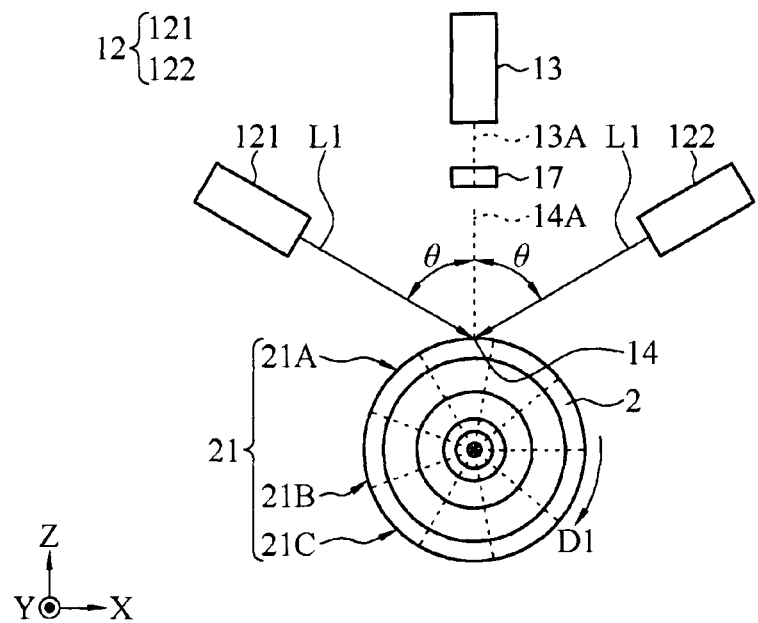
FIG. 30 is a schematic diagram of a fourth implementation of relative optical positions of the object, the light source component and the photosensitive element in FIG. 16.

In some embodiments, referring to FIG. 30, the image scanning system can further include a polarizing plate 17. The polarizing plate 17 is located on the optical axis 13A of the photosensitive element 13 and is configured between the photosensitive element 13 and the detection position 14. Herein, the photosensitive element 13 performs image capturing of the surface of the object 2 though the polarizing plate 17. With the polarization filtering of the polarizing plate 17, saturation glare caused upon the photosensitive element 13 due to strong far infrared light can be effectively prevented, thereby improving the quality of detection images captured by the photosensitive element 13 and hence obtaining low-disturbance penetrating images.

In some embodiments, the positions of the light source component 12 and the photosensitive element 13 can be appropriately designed, such that the light incident angle θ is not equal to the light reflection angle α to accordingly reduce glare, thereby improving the quality of detection images captured by the photosensitive element 13 and hence obtaining low-disturbance penetrating images.

In some embodiments, the light source adjustment component 16 can sequentially adjust the position of the light source component 12, such that the photosensitive element 13 capture the detection images MB of the object respectively under different light incident angles θ. On this basis, the image scanning system can obtain multiple detection images MB of each area of the same object 2 under different light incident angles θ. In other words, the photosensitive element 13 performs image capturing for multiple times on the basis of the light L1 of different light incident angles θ for the same area, so as to obtain multiple detection images MB of the same area.

Figure 31:
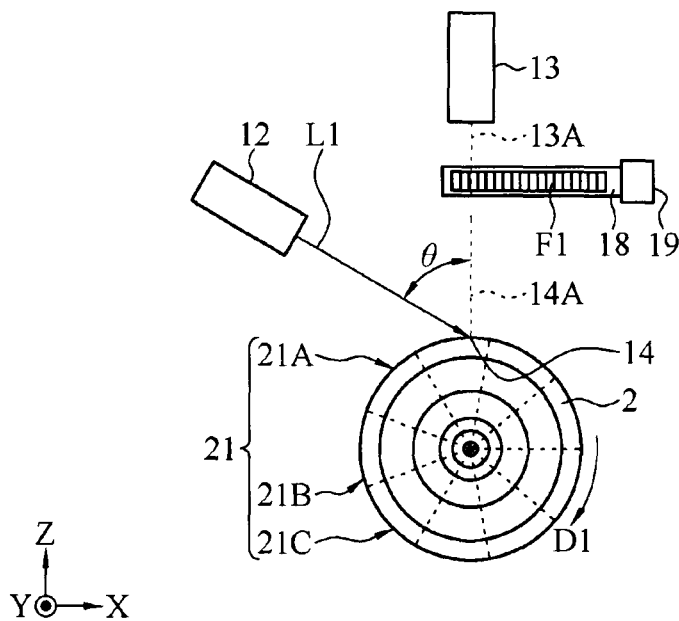
FIG. 31 is a schematic diagram of a fifth implementation of relative optical positions of the object, the light source component and the photosensitive element in FIG. 16.
Figure 32:
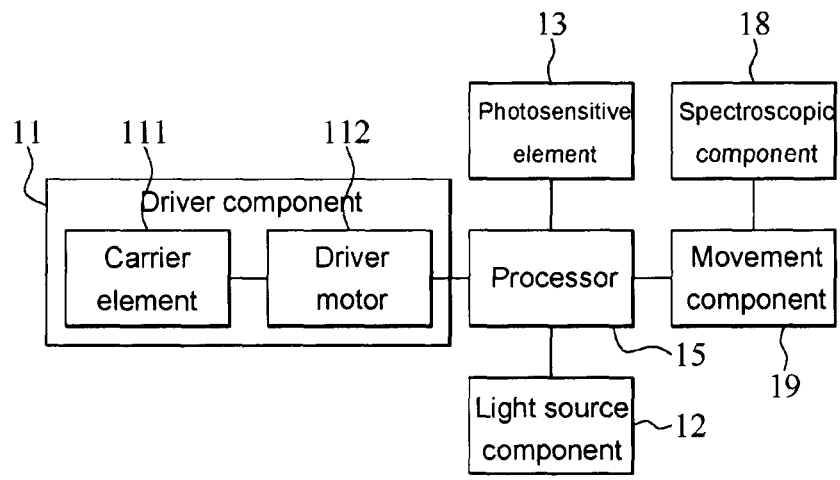
FIG. 32 is a function schematic diagram of an image scanning system for a surface type of an object according to another embodiment of the present invention.

In some embodiments, referring to FIG. 31 and FIG. 32, the image scanning system can further include a spectroscopic component 18. The spectroscopic component 18 is located between the photosensitive element 13 and the detection position 14; alternatively speaking, spectroscopic component 18 is located between the photosensitive element 13 and the object 2. The spectroscopic component 18 has a plurality of filter regions F1 respectively corresponding to a plurality of spectra. At this point, the light source component 12 provides multi-spectrum light to illuminate a detection position 14. Herein, the multi-spectrum light has sub-light of a plurality of spectra. Thus, by switching the filter regions F1 of the spectroscopic component 18 (i.e., respectively moving the filter regions F1 onto the photosensitive axis 13A of the photosensitive element 13), the photosensitive element 13 is enabled to capture, through the filter regions F1, a detection image MB of the area (one of 21A to 21C) located at the detection position 14, so as to obtain the detection image MB of multiple different spectra. That is to say, when the multi-spectrum light from the light source component 12 illuminates upon the object 2 at the detection position 14, the multi-spectrum light is diffused by the surface of the object 2, and the diffused light is filtered by any one filter region F1 of the spectroscopic component 18 to become sub-light having a spectrum corresponding to the filter region F1 and then enters the sensing region of the photosensitive element 13. At this point, only one single spectrum (an intermediate value of an optical waveband) remains in the sub-light arriving at the photosensitive element 13. When the same filter region F1 is aligned with the photosensitive axis 13A of the photosensitive element 13, the driver component 11 moves one area each time to the detection position 14, and the photosensitive element 13 captures after each movement the detection image MB of the area currently located at the detection position 14, so as to obtain the detection images MB of all the areas 21A to 21C under the same spectrum. Then, the spectroscopic component 18 switches to and aligns another filter region F1 with the photosensitive axis 13A of the photosensitive element 13, and again sequentially moves the areas and captures the detection images MB of the areas. The steps above are repeated similarly to obtain the detection images MB having the spectra respectively corresponding to the filter regions F1. In other words, the light source component 12 can have a wider optical waveband of light wavelengths, and by providing on a light incident path or a light absorbing path the spectroscopic component 18 allowing light of certain light wave bands to pass through, the photosensitive element 13 is provided with the light L1 of an expected light wavelength.

In some embodiments, referring to FIG. 31 and FIG. 32, the image scanning system can further include a movement component 19. The movement component 19 is coupled to the spectroscopic component 18. During the operation of the image scanning system, the movement component 19 sequentially moves one of the filter regions F1 of the spectroscopic component 18 to the photosensitive axis 13A of the photosensitive element 13.

In another embodiment, the spectroscopic component can be configured at a light incident end instead. In some embodiments, referring to FIG. 33 and FIG. 34, the image scanning system can further include a spectroscopic component 18'. The spectroscopic component 18' is located between the light source component 12 and the detection position 14; alternatively speaking, the spectroscopic component 18' is located between the light source component 12 and the object 2. The spectroscopic component 18' has a plurality of filter regions F1 respectively corresponding to a plurality of spectra. At this point, the light source component 12 provides multi-spectrum light to illuminate the detection position 14 through the spectroscopic component 18'. Herein, the multi-spectrum light has sub-light of a plurality of spectra. Thus, by switching the filter regions F1 of the spectroscopic component 18' (i.e., respectively moving the filter regions F1 to the optical axis of the light source component 12), such that the multi-spectrum light outputted from the light source component 12 is filtered by the filter region F1 of the spectroscopic component 18' into sub-light of a single spectrum, and then emitted upon the object 2 at the detection position 14. At this point, the photosensitive element 13 can capture the detection image MB of a specific spectrum of the area (one of the areas 21A to 21C) located at the detection position 14. When the same filter region F1 is aligned with the optical axis of the light source component 12, the driver component 11 moves one area each time to the detection position 14, and the photosensitive element 13 captures after each movement the detection image MB of the area currently located at the detection position 14, so as to obtain the detection images MB of all the areas 21A to 21C under the same spectrum. Then, the spectroscopic component 18' switches to and aligns another filter region F1 with the optical axis of the light source component 12, and again sequentially moves the areas and captures the detection images MB of the areas. The steps above are repeated similarly to obtain the detection images MB having the spectra respectively corresponding to the filter regions F1. In other words, the light source component 12 can have a wider optical waveband of light wavelengths, and by providing on a light incident path the spectroscopic component 18' allowing light of certain light wave bands to pass through, the light L1 of an expected light wavelength is provided and emitted upon the detection position 14.

Figure 33:
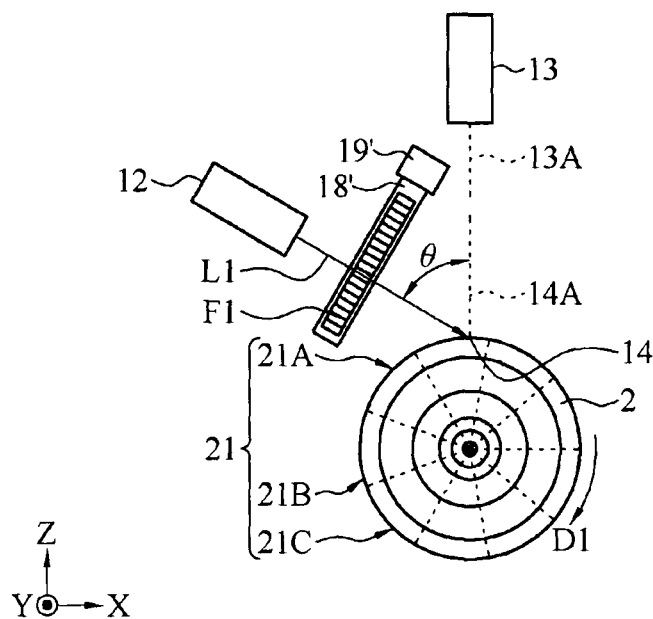
FIG. 33 is a schematic diagram of a sixth implementation of relative optical positions of the object, the light source component and the photosensitive element in FIG. 16.
Figure 34:
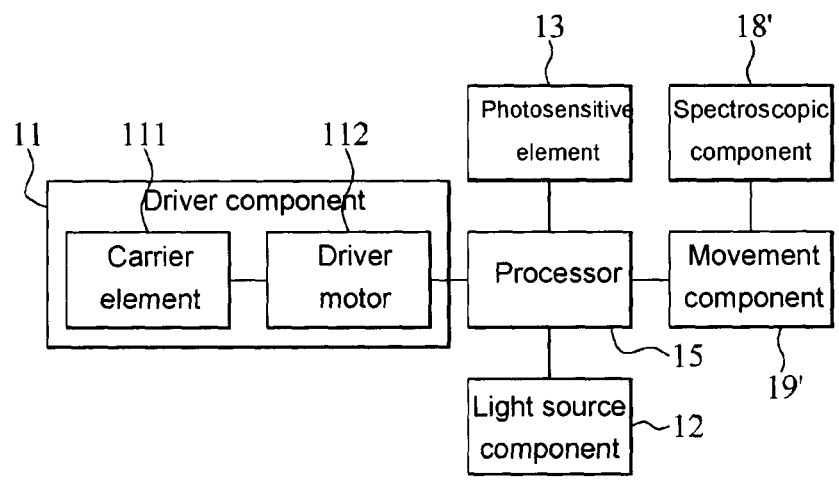
FIG. 34 is a function schematic diagram of an image scanning system for a surface type of an object according to yet another embodiment of the present invention.

In some embodiments, referring to FIG. 33 and FIG. 34, the image scanning system can further include a movement component 19'. The movement component 19' is coupled to the spectroscopic component 18'. During the operation of the image scanning system, the movement component 19' sequentially moves one of the filter regions F1 of the spectroscopic component 18' to the optical axis of the light source component 12.

In some embodiments, the optical waveband of the multi-spectrum light provided by the light source component 12 can be between 300 nm and 2100 nm, and the optical wavebands individually allowed to pass through the multiple filter regions F1 of the spectroscopic component 18 (18') are respectively any non-overlapping sections between 300 nm and 2100 nm. Herein, the optical wavebands individually allowed to pass through the multiple filter regions F1 of the spectroscopic component 18(18') can be continuous or discontinuous. For example, assuming that the optical waveband of the multi-spectrum light is between 300 nm and 2100 nm, the optical wavebands individually allowed to pass through the multiple filter regions F1 of the spectroscopic component 18 (18') can be 300 nm to 600 nm, 600 nm to 900 nm, 900 nm to 1200 nm, 1200 nm to 1500 nm, 1500 nm to 1800 nm, and 1800 nm to 2100 nm. In another example, assuming that the optical waveband of the multi-spectrum light is between 380 nm and 750 nm, the optical wavebands individually allowed to pass through the multiple filter regions F1 of the spectroscopic component 18 (18') can be 380 nm to 450 nm, 495 nm to 570 nm, and 620 nm to 750 nm. In some embodiments, each spectrum above can be represented by a waveband of a single color or an intermediate value thereof.

In some embodiments, the spectroscopic component 18 (18') can be a spectrometer. In some embodiments, the movement component 19 (19') can be implemented by a driver motor, wherein the driver motor can be a step motor.

Figure 35:
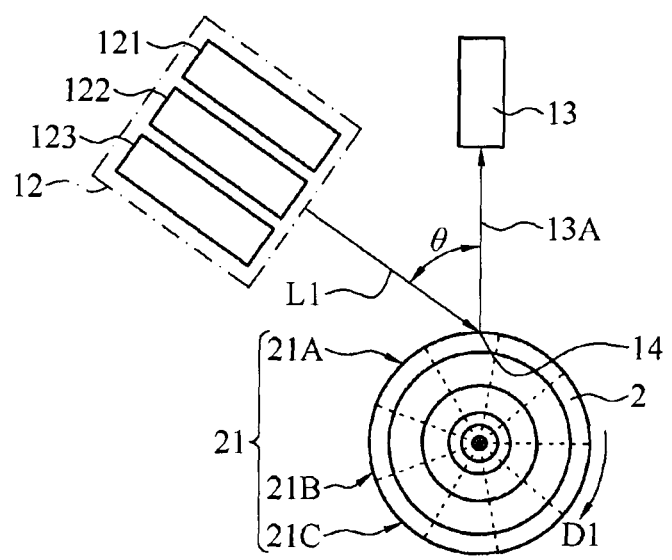
FIG. 35 is a schematic diagram of a seventh implementation of relative optical positions of the object, the light source component and the photosensitive element in FIG. 16.

In some embodiments, referring to FIG. 35, the image scanning system can use multiple light emitting elements 121 to 123 of different spectra to provide the light L1 of a plurality of spectra, and the light emitting elements 121 to 123 of different spectra are sequentially actuated, enabling the photosensitive element 13 to obtain detection images of multiple different spectra. In other words, the light source module 12 includes the plurality of light emitting elements 121 to 123, and these light emitting elements 121 to 123 respectively correspond to multiple non-overlapping optical wavebands. In some embodiments, the optical wavebands can be continuous or discontinuous.

Figure 36:
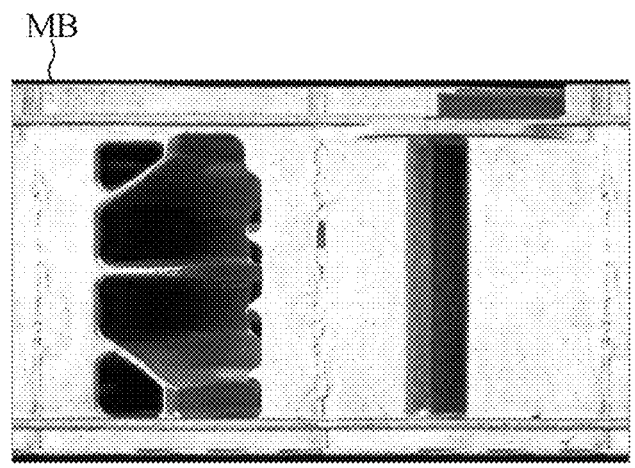
FIG. 36 is a schematic diagram of another example of a detection image.
Figure 37:
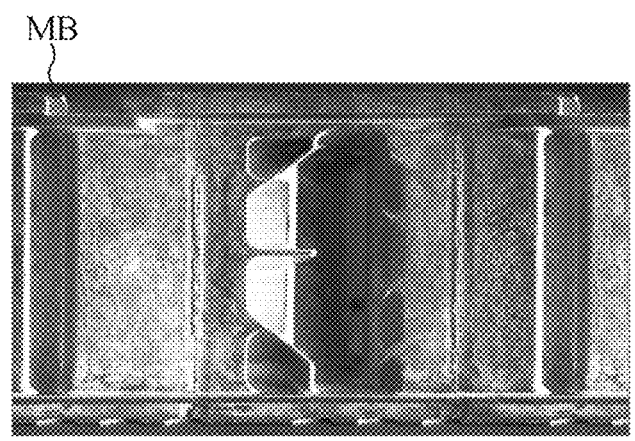
FIG. 37 is a schematic diagram of yet another example of a detection image.

For example, the light source component 12 includes red LED, a blue LED and a green LED. When the red LED illuminates, the photosensitive element 13 can obtain a detection image MB of a red spectrum. When the blue LED illuminates, the photosensitive element 13 can obtain a detection image MB of a blue spectrum, as shown in FIG. 36. When the green LED illuminates, the photosensitive element 13 can obtain a detection image MB of a green spectrum, as shown in FIG. 37. Herein, details presented in the detection images MB under light of different wavebands are different. For example, grooves presented in the detection image MB under the blue spectrum are more apparent, and bumps presented in the detection image MB under the green spectrum are more apparent.

On this basis, the image scanning system can obtain multiple detection images MB of different spectrum for each area of the same object 2. In other words, the photosensitive element 13 performs image capturing for multiple times on the same area on the basis of the light L1 of different optical wavebands so as to obtain multiple detection images MB of different spectra for the same area.

Figure 28:
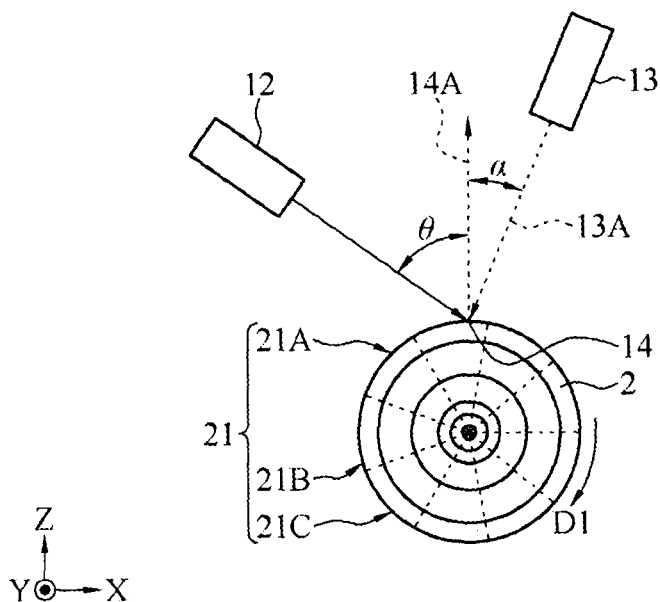
FIG. 28 is a schematic diagram of a third implementation of relative optical positions of the object, the light source component and the photosensitive element in FIG. 16.

In some embodiments, as shown in FIG. 28, FIG. 31 and FIG. 33, the light source component 12 can include one light emitting element.

In some other embodiments, as shown in FIG. 18, FIG. 19 and FIG. 30, the light source component 12 can include two light emitting elements 121 and 122, and the two light emitting elements 121 and 122 are symmetrically arranged on two opposite sides of the object 2 relative to the normal line 14A and individually illuminate the detection position 14. The surface 21 is illuminated by the symmetrical detection light L1 and thus symmetrical diffused light is generated, and the photosensitive element 13 sequentially captures, according to the symmetrical diffused light, detection images of the areas 21A to 21C located at the detection position 14, hence enhancing the imaging quality of the detection images. In some embodiments, each of the light emitting elements 121 and 122 can be implemented by one or more light emitting diodes (LED); in some embodiments, each of the light emitting elements 121 and 122 can be implemented by a laser light source.

In one embodiment, the image scanning system can include one single light source component 12, as shown in FIG. 14.

Figure 38:
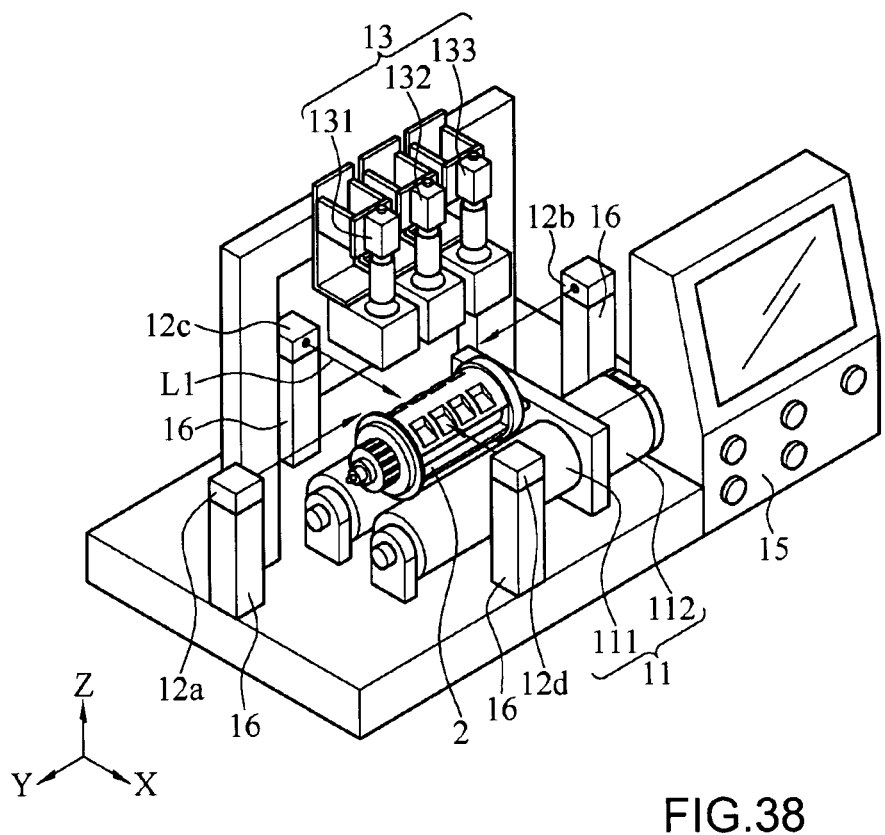
FIG. 38 is a schematic diagram of an image scanning system for a surface type of an object according to the second embodiment of the present invention.
Figure 39:
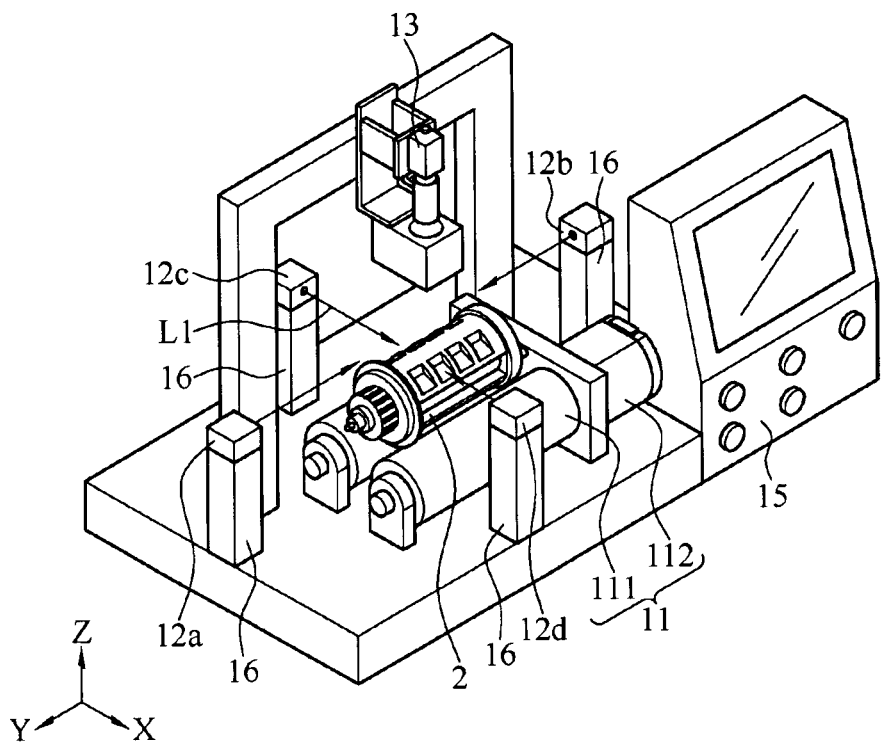
FIG. 39 is a schematic diagram of an image scanning system for a surface type of an object according to the third embodiment of the present invention.
Figure 40:
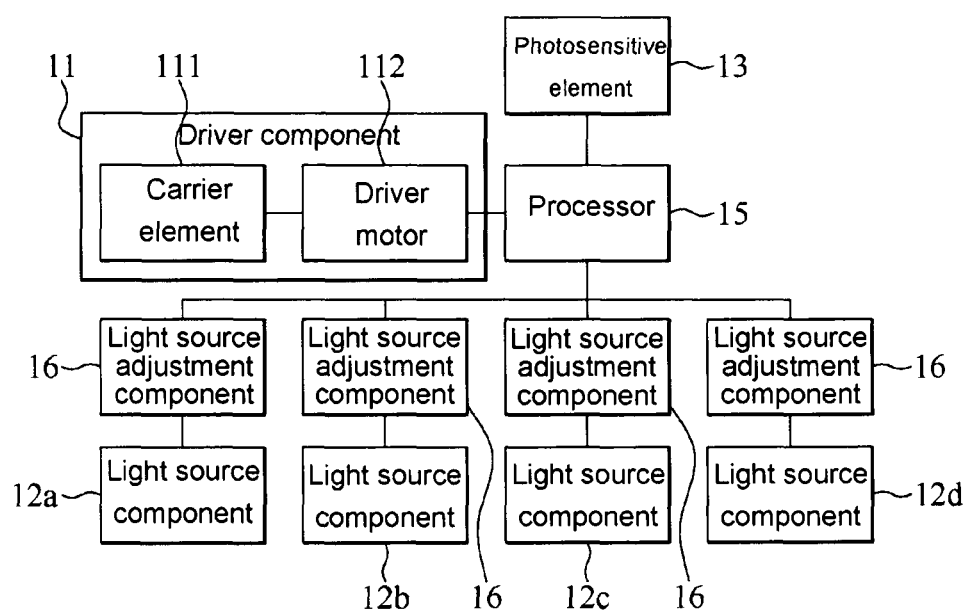
FIG. 40 is a schematic diagram of an image scanning system for a surface type of an object according to another embodiment of the present invention.

In another embodiment, referring to FIG. 38 to FIG. 40, the image scanning system can include multiple light source components 12a, 12b, 12c and 12d. The light source components 12a, 12b, 12c and 12d are respectively located in different directions from the detection position 14, that is, located in different directions from the carrier element 111 of the object 2 carried. Thus, the image scanning system can obtain object images having optimal spatial information of surface features. For example, the light source component 12a can be arranged on the front side of the detection position 14 (or the carrier element 111), the light source component 12b can be arranged on the rear side of the detection position 14 (or the carrier component 111), the light source component 12c can be arranged on the left side of the detection position 14 (or the carrier element 111), and the light source component 12d can be arranged on the right side of the detection position 14 (or the carrier component 111).

Herein, under the lighting of each light source component (any one of 12a, 12b, 12c and 12d), the image scanning system performs the image capturing procedure once, so as to obtain the detection images MB of all the areas 21A to 21C of the object 2 under a specific lighting direction. For example, assume that the image scanning system first has the light source component 12a emit the light L1. Under the light L1 emitted from the light source component 12a, the photosensitive element 13 captures the detection images MB of all the areas 21A to 21C of the object 2. Then, the image scanning system switches to the light source component 12b to emit the light L1. Under the light L1 emitted from the light source component 12b, the photosensitive element 13 similarly captures the detection images MB of all the areas 21A to 21C of the object 2. Next, the image scanning system switches to the light source component 12c to emit the light L1. Under the light L1 emitted from the light source component 12c, the photosensitive element 13 similarly captures the detection images MB of all the areas 21A to 21C of the object 2. Next, the image scanning system switches to the light source component 12d to emit the light L1. Under the light L1 emitted from the light source component 12d, the photosensitive element 13 similarly captures the detection images MB of all the areas 21A to 21C of the object 2.

On this basis, the image scanning system can obtain multiple detection images MB under lighting of different light sources 12a to 12d for each area of the same object 2. In other words, the photosensitive element 13 performs image capturing for multiple times on the basis of the light L1 provided by the different light source modules 12a to 12d so as to obtain multiple detection images MB of different lighting directions for the same area. In some embodiments, the image scanning system can integrate object images IM under different lighting directions to enhance imaging differentiation of various surface types of an object, so as to improve identification of a surface type of an object and to further obtain an optimal resolution of the surface type of the object. For example, the image scanning system forms, by integrating object images IM of the object 2 under different lighting directions, noticeably different imaging effects between an attachment and a surface type on the surface 21 of the object, for facilitating surface type identification of an object.

Figure 41:
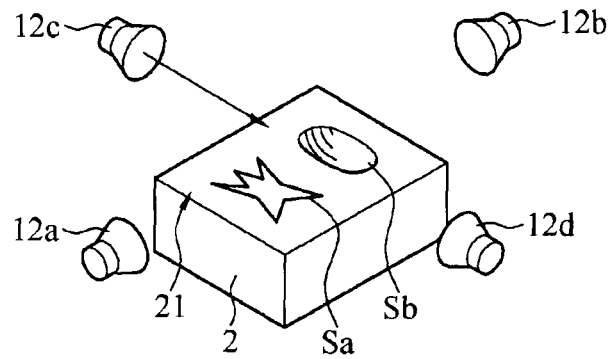
FIG. 41 is a partial schematic diagram of an implementation of an image scanning system for a surface type of an object.
Figure 42:
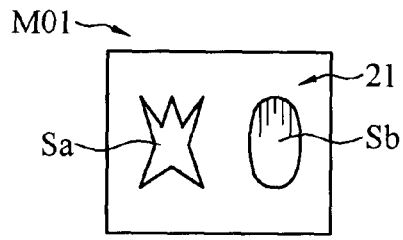
FIG. 42 to FIG. 45 are schematic diagrams of images respectively obtained under lighting of the four light source modules shown in FIG. 41.
Figure 43:
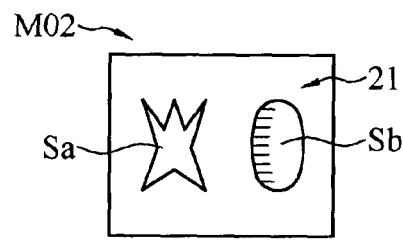
Figure 44:
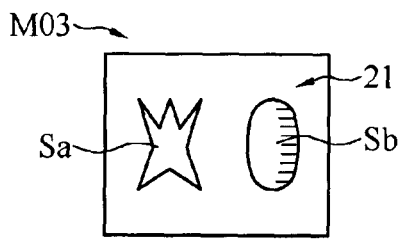
Figure 45:
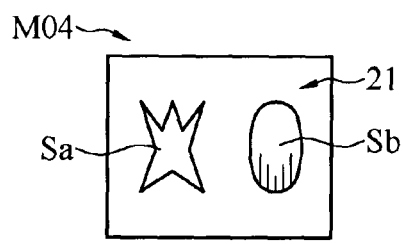
Figure 46:
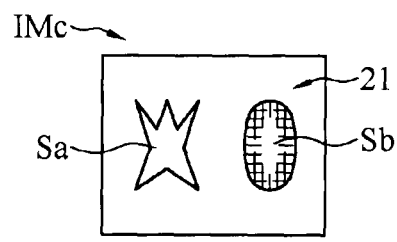
FIG. 46 is a schematic diagram of an example of an initial image.

For example, referring to FIG. 41, the image scanning system can include four light source components 12a, 12b, 12c and 12d respectively provided on the upper side, the lower side, the left side and the right side of the detection position 14. Assume that the surface 21 of the object 2 has an attachment of a pattern Sa and a surface pattern of a slot Sb. In the image capturing procedure, the photosensitive element 13 can capture an image M01 of the surface 21 of the object 2 on the basis of the light L1 provided by the light source module 12a (as shown in FIG. 42), capture an image M02 of the surface 21 of the object 2 on the basis of the light L1 provided by the light source module 12b (as shown in FIG. 43), capture an image M03 of the surface 21 of the object 2 on the basis of the light L1 provided by the light source module 12c (as shown in FIG. 44), and capture an image M04 of the surface 21 of the object 2 on the basis of the light L1 provided by the light source module 12d (as shown in FIG. 45). Referring to FIG. 42 to FIG. 45, in the images M01 to M04, a shadow is not generated the image of the pattern Sa although the lighting directions are different, but a corresponding shadow is generated the image of the slot Sb due to the different lighting directions. The processor 15 superimposes the images M01 to M04 of the object 2 into a superimposed object image (i.e., the initial image IMc), as shown in FIG. 46. When the initial image IMc is fed to the artificial neural network system 30 or any one sub neural network system 33, the artificial neural network system 30 or the sub neural network system 33 can determine, based on whether a shadow is presented in the image of the initial image IMc (e.g., whether a shadow is present or not, or a presentation position), whether the surface of the object 2 has an attachment and/or a surface type. Taking the initial image IMc shown in FIG. 46 for example, the sub neural network system 33 executes the predictive model by using the initial image IMc, and can thus determine whether the surface 21 of the object 2 has an attachment and a slot.

In some embodiments, between optical axes (e.g., the light L1) of any two adjacent light components among the light source modules 12a to 12d is the same predetermined included angle. For example, when viewing the image scanning system from the top, the light source modules 12a to 12d are arranged at intervals of a fixed angle around the center of the detection position 14.

In some embodiments, the light source modules 12a to 12d provide the light L1 with the same light incident angle θ toward the detection position 14.

In some embodiments, for the same area, the photosensitive element 13 captures multiple detection images MB of the same spectrum on the basis of the light L1 provided by different light source modules 12a to 12d.

In some embodiments, for the same area, the photosensitive element 13 can also capture multiple detection images MB of different spectra on the basis of the light L1 provided by different light source modules 12a to 12d. For example, assume that the image scanning system includes four light source modules 12a to 12d respectively provided on the upper side, the lower side, the left side and the right side of the detection position 14. The photosensitive element 13 captures the detection image MB of a first spectrum of the area 12A on the basis of the light L1 provided by the light source module 12a, captures the detection image MB of a second spectrum of the area 12A on the basis of the light L1 provided by the light source module 12b, captures the detection image MB of a third spectrum of the area 12A on the basis of the light L1 provided by the light source module 12c, and captures the detection image MB of a fourth spectrum of the area 12A on the basis of the light L1 provided by the light source module 12d. Wherein, the first spectrum to the fourth spectrum respectively belong to different optical wavebands.

In some embodiments, for the same area, the photosensitive element 13 captures multiple detection images MB of different spectrum on the basis of the light L1 provided by each of the different light source modules 12a to 12d. For instance, taking the light source module 12a and the area 12A for example, under the lighting of the light source module 12a, the photosensitive element 13 can capture the detection image MB of different spectra for the same area 21A by using the spectroscopic component 18 (18').

In some embodiment, as shown in FIG. 16, FIG. 36 and FIG. 37, the object 2 is cylindrical in shape, for example, a spindle. That is, the body 201 of the object 2 is cylindrical in shape. Herein, the surface 21 of the object 2 can be a lateral surface of the body 201 of the object 2, that is, the surface 21 is a cylindrical surface and has a radian of 2π. Herein, the first direction D1 ca be a clockwise direction or a counterclockwise direction with respect to the long axis of the body of the object 2 as a rotation axis. In some embodiments, one end of the object 2 is a narrower and smaller structure compared to the opposite end. In one example, referring to FIG. 17, FIG. 24 and FIG. 26, the carrier element 111 can be two rollers spaced by a predetermined distance, and driver motor 112 is coupled to rotating shafts of the two rollers. Herein, the predetermined distance is less than the diameter of the object 2 (the minimum diameter of the body). Thus, the object 2 can be movably arranged between the two rollers. Further, while the driver motor 112 rotates the two rollers, the object 2 is driven and hence rotated by the rollers due to the surface frictional force between the object 2 and the two rollers and is thus rotated along the first direction D1 of the surface 21, thus aligning an area to the detection position 14. In another example, the carrier element 111 can be a rotating shaft, and the driver motor 112 is coupled to one end of the rotating shaft. At this point, the other end of the rotating shaft has an embedding member (e.g., an insertion hole). At this point, in the detection procedure, the object 2 is removably embedded in the embedding member. Further, while the driver motor 112 rotates the rotating shaft, the object 2 is driven by the rotating shaft and is rotated along the first direction D1 of the surface 21, thus aligning an area to the detection position 14. In some embodiments, assuming that the surface 21 is divided into nine surface areas 21A to 21C for example, the driver motor 112 drives the carrier element 111 to rotate by 40 degrees each time, such that the object 2 is driven to rotate along the first direction D1 of the surface 21 by 40 degrees. In some embodiments, the rotation angle (for fine tuning the position of the object 2) of the driver motor 112 in step S13 is less than the rotation angle) for moving the next area to the detection position 14) of the driver motor 13 in step S15.

In one embodiment, as shown in FIG. 47 to FIG. 50, the object 2 is plate-like in shape. That is, the body 201 of the object 2 has a planar surface. The surface 21 (i.e., the planar surface of the body 201) of the object 2 is a non-curved surface having a curvature of equal to zero or approximately equal to zero. Herein, the first direction D1 can be an extension direction of any side (e.g., the long side) of the surface 21 of the object 2. In one example, the carrier element 111 can be a planar carrier board, and the driver motor 112 is coupled to one side of the planar carrier board. At this point, in the image capturing procedure, the object 2 can be removably arranged on the planar carrier board. The driver motor 112 drives the planar carrier board to move along the first direction D1 of the surface 21 so as to drive and move the object 2, thus aligning an area to the detection position 14. Herein, the driver motor 112 drives the planar carrier board to move by a predetermined distance each time, and sequentially moves each of the areas 21A to 21C to the detection position by repeatedly driving the planar carrier board. Herein, the predetermined distance is substantially equal to the width of each of the areas 21A to 21C along the first direction D1.

In some embodiments, the driver motor 112 can be a step motor.

Figure 47:
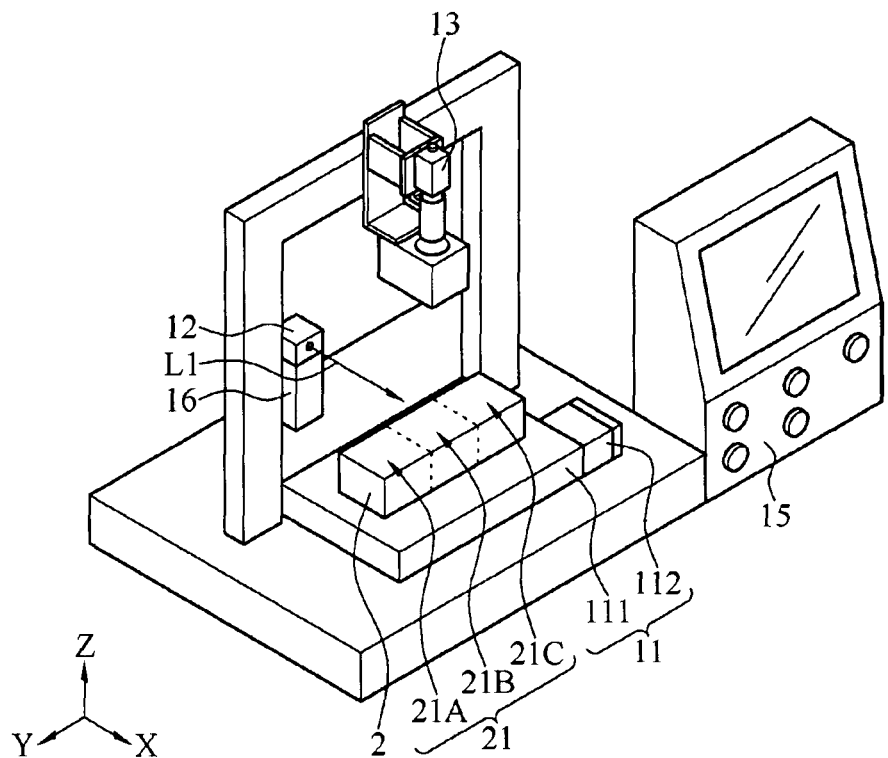
FIG. 47 is a schematic diagram of an image scanning system for a surface type of an object according to the fourth embodiment of the present invention.
Figure 48:
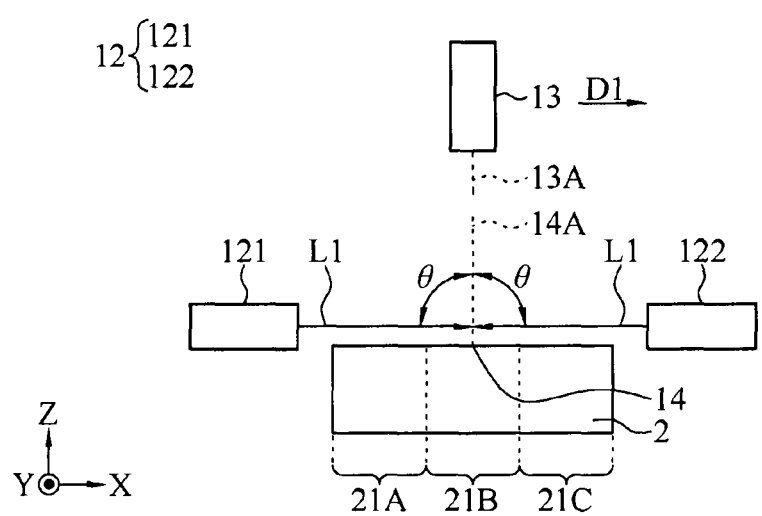
FIG. 48 is a schematic diagram of a first implementation of relative optical positions of the object, the light source component and the photosensitive element in FIG. 47.
Figure 49:
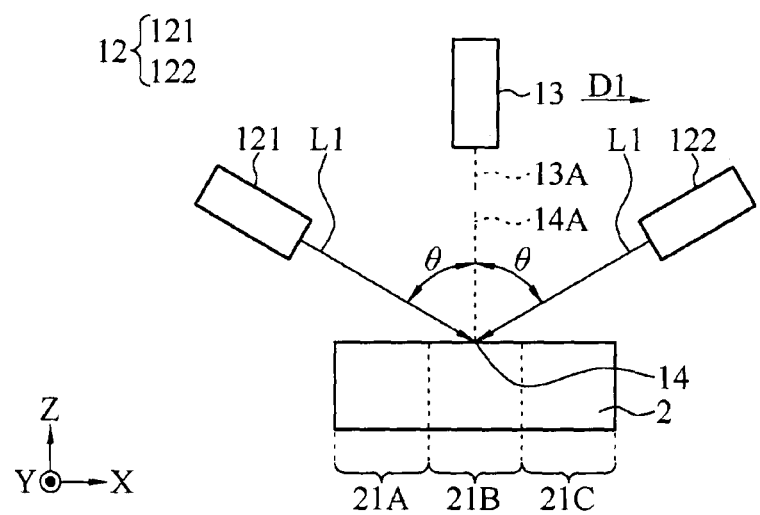
FIG. 49 is a schematic diagram of a second implementation of relative optical positions of the object, the light source component and the photosensitive element in FIG. 47.
Figure 50:
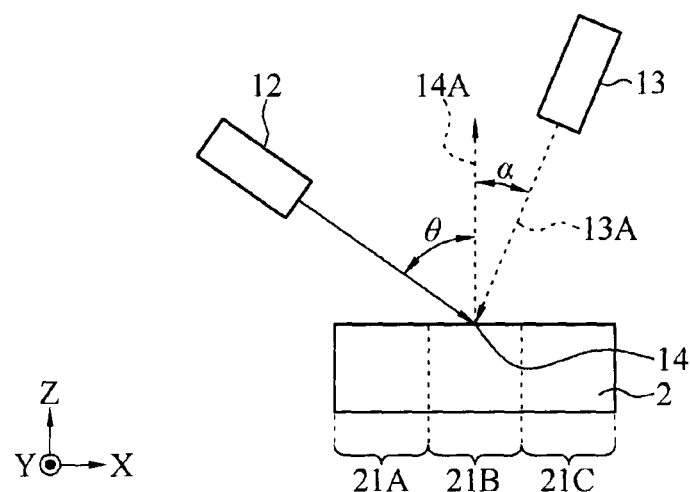
FIG. 50 is a schematic diagram of a third implementation of relative optical positions of the object, the light source component and the photosensitive element in FIG. 47.

In one embodiment, referring to FIG. 39 and FIG. 47, the image scanning system can be provided with one single photosensitive element 13, and the photosensitive element 13 performs image capturing of multiple areas 21A to 21C so as to obtain multiple detection images respectively corresponding to the areas 21A to 21C.

In one example, assume that the object 2 is cylindrical in shape and the image scanning system is provided with one single photosensitive element 13. The photosensitive element 13 can perform image capturing of multiple areas 21A to 21C of the body (i.e., the middle section) of the object 2 to obtain multiple detection images MB respectively corresponding to the areas 21A to 21C, and the processor 15 then combines the detection images MB of the areas 21A to 21C into an object image IM, as shown in FIG. 15.

In another embodiment, referring to FIG. 16 and FIG. 38, the image scanning system can be provided with multiple photosensitive elements 13, and these photosensitive elements 13 face the detection position 14 and are arranged along the long axis of the object 2.

These photosensitive elements 13 respectively capture detection images of areas located at the detection position 14 for different sections of the object 2.

Figure 51:
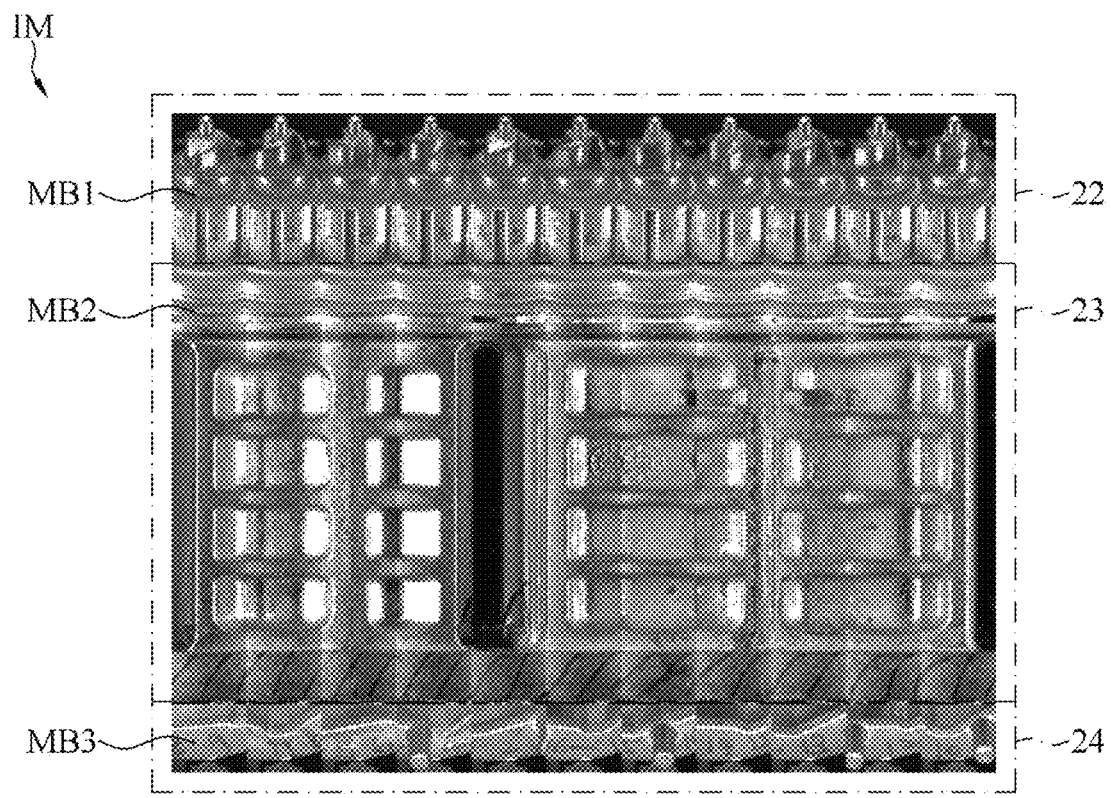
FIG. 51 is a schematic diagram of another example of an object image.

In another example, assume that the object 2 is cylindrical in shape and the image scanning system is provided with multiple photosensitive elements 131 to 133, as shown in FIG. 16. These photosensitive elements 131 to 133 respectively capture detection images MB1 to MB3 of different section positions of the surface of the object 2 located the detection position 14, and the processor 15 then combines all the detection images MB1 to MB3 into the object image IM, as shown in FIG. 51. For example, assume that the photosensitive elements 131 to 133 are in a quantity of three, and the processor 15 combines the detection images MB1 to MB3 captured by the photosensitive elements 131 to 133 into the object image IM of the object 2, as shown in FIG. 51. Wherein, the image object IM includes a sub object image 22 (the upper part of the object image IM in FIG. 51) combined from the detection images MB1 of all the areas 21A to 21C captured by the first photosensitive element 131 among the three photosensitive elements 13, a sub object image 23 (the middle part of the object image IM in FIG. 51) combined from the detection images MB2 of all the areas 21A to 21C captured by the second photosensitive element 132 among the three photosensitive elements 13, and a sub object image 24 (the lower part of the object image IM in FIG. 51) combined from the detection images MB3 of all the areas 21A to 21C captured by the third photosensitive element 133 among the three photosensitive elements 13.

In some embodiments, although an example of the image scanning system capturing the detection images of all areas of the object 2 is taken as an example, the present invention is not limited thereof. The image scanning system can also be applied for directly capturing a detection image of a complete surface of a small object 2 (i.e., the surface of the object 2 facing the photosensitive element 13, the area of the surface being equal to or less than a viewing angle of the photosensitive element 13), or capturing only a detection image of any one region or any multiple regions of all areas of the object 2 through settings.

In some embodiments, the processor 15 can directly use the detection image MB of any of the areas 21A to 21C of the object 2 captured by the photosensitive element 13 as the object image IM.

In some embodiments, the processor 15 can automatically determine according to the object image IM obtained whether the surface 21 of the object 2 contains surface defects, whether the surface 21 has different textures, and whether the surface 21 has attachments such as paint or grease; that is, the processor 15 can automatically determine different surface types of the object 2 according to the object image.

More specifically, the processor 15 can include the foregoing artificial neural network system 30, so as to automatically perform surface type categorization according to the object images IM obtained, thereby automatically determining the surface type of the surface 21 of the object 2. In one example, before the artificial neural network system 30 is created, the object images IM generated by the processor 15 can be used for training (deep learning) by the multiple sub neural network systems 33 of the artificial neural network system 30, so as to build respective predictive models for identifying a surface type of an object. In another example, before the artificial neural network system 30 is created, the object images IM generated by the processor 15 can be subsequently fed to the trained multiple sub neural network system 33, so as to obtain respective determination defect rates. In addition, the processor 15 further cascades these sub neural network systems 33 according to the respective determination defect rates to obtain the artificial neural network system 30. In another example, after the artificial neural network system 30 is created, the object images IM generated by the processor 15 can be subsequently used for prediction categorization by the artificial neural network system 30, so as to perform categorization prediction of the object images IM by the respective predictive models of the sub neural network systems 33.

In some embodiments, the object images IM generated by the processor IM can be fed to another processor including the foregoing artificial neural network system 30, so as to have the artificial neural network system 30 automatically perform surface type categorization according to the object images IM obtained, thereby automatically determining the surface type of the surface 21 of the object 2.

In one embodiment, the image scanning system and the artificial neural network system 30 can be implemented on the same host. For example, the image scanning system and the artificial neural network system 30 are implemented on the same host, and the host includes the processor 15 for controlling the operation of the image scanning system and executing the artificial neural network system 30. In another example, the image scanning system and the artificial neural network system 30 are implemented on the same host, and the host includes the processor 15 for controlling the operation of the image scanning system and another processor for executing the artificial neural network system 30. In another embodiment, the image scanning system and the artificial neural network system 30 can also be implemented on different hosts. In other words, the image scanning system and the artificial neural network system 30 are implemented on two different hosts. These two hosts can be connected by wired or wireless means so as to transmit information such as the object images IM.

In some embodiments, the artificial neural network system 30 can be created and applied on different processors (or hosts). In other words, after one processor cascades multiple neural network systems 33 into the artificial neural network system 30, and the artificial neural network system 30 formed is loaded to another processor and executed thereon.

In some embodiments, the foregoing sub neural network system 33 can also operate independently. In one embodiment, the processor 15 can include any one sub neural network system 33, so as to automatically perform surface type categorization according to the object images IM obtained. In the learning phase, the sub neural network system 33 performs deep learning by using the object images IM, so as to build a predictive model for an object surface type. In the prediction phase, the object images IM generated by the processor 15 can be subsequently used by the sub neural network system 33 to perform prediction categorization by the predictive model, so as to identify a surface type of an object. In some embodiments, the object images IM generated by the processor 15 are fed to another processor including the foregoing sub neural network system 33, so as to have the sub neural network system 33 to automatically perform surface type categorization according to the object images IM obtained.

In one embodiment, the image scanning system and the sub neural network system 33 can be implemented on the same host. For example, the image scanning system and the sub neural network system 33 are implemented on the same host, and the host includes the processor 15 for controlling the operation of the image scanning system and executing the sub neural network system 33. In another example, the image scanning system and the sub neural network system 33 are implemented on the same host, and the host includes the processor 15 for controlling the operation of the image scanning system and another processor for executing the sub neural network system 33. In another embodiment, the image scanning system and the sub neural network system 33 can also be implemented on different hosts. In other words, the image scanning system and the sub neural network system 33 are implemented on two different hosts. These two hosts can be connected by wired or wireless means so as to transmit information such as the object images IM.

In some embodiments, given that the sub neural network system 33 operates independently, the sub neural network system 33 can be created (i.e., the learning phase) and applied (i.e., the prediction phase) on different processors (or hosts). In other words, one processor includes the sub neural network system 33 that is not yet trained, and trains the sub neural network system 33 by using multiple object images IM (performing deep learning) so as to build a predictive model thereof. Then, the trained sub neural network system 33 is loaded to another processor to perform categorization prediction.

For instance, in one example, if the object 2 is an unqualified object, the surface of the object 2 has one or more surface types that the artificial neural network system has already learned and attempts to capture, such that at least one sub neural network system 33 then selects these surface types; conversely, if the object 2 is a qualified object, the surface of the object 2 does not possess any surface types that have been recorded and are used for triggering the selection action of the sub neural network system 33. In the learning phase, among the object images IM received by the sub neural network system 33, some are labels of categories with one or more surface types, and others are labels of categories without surface types. Further, the output of the sub neural network system 33 sets a plurality of surface type categories according to these surface types in advance. In another example, if the object 2 is an unqualified object, the surface of the object 2 has one or more first-type surface types that the artificial neural network system has already learned and attempts to capture; conversely, if the object 2 is a qualified object, the surface of the object 2 has one or more second-type surface types that one or more other artificial neural network systems have already learned and attempt to capture, wherein the second-type surface type can be, for example, a standard surface type. In the learning phase, among the object images IM received by the sub neural network system 33, some are labels of categories with one or more first-type surface types, and others are labels of categories with one or more second-type surface types. Further, the output of the sub neural network system 33 sets a plurality of surface type categories according to these surface types in advance.

Figure 52:
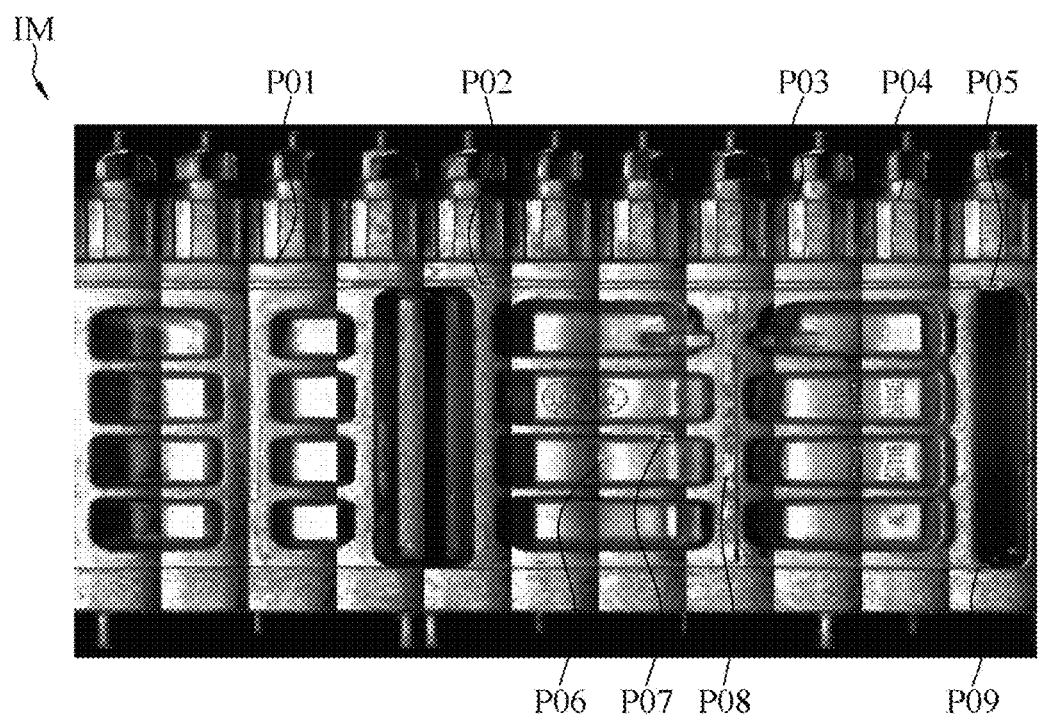
FIG. 52 is a schematic diagram of yet another example of an object image.

Referring to FIG. 52, when the surface of the object 2 has at least one surface type, partial images P01 to P09 presenting the surface type are also shown at corresponding positions in the object image IM of the object.

In some embodiments, in the learning phase, the object images IM received by the sub neural network system 33 are known surface types (i.e., an existing target surface type labeled thereon), and the surface type categorizes outputted by the sub neural network system 33 are also set in advance. In other words, each object image IM used for performing deep learning is labeled with an existing object type. In some embodiments, the label of the category of the object type can present a label pattern on the object image IM (as shown in FIG. 52), and/or record object information in image information of the object image IM.

In some embodiments, in the learning phase, the sub neural network system 33 uses the object images IM with known surface types to perform training, so as to generate determination items of each neural in the predictive model and/or adjust a weighting connecting any neurons, such that a prediction result (i.e., a predetermined surface type category outputted) of each object image matches a known surface type that is labeled as learned, thereby building a predictive model for identifying a surface type of an object.

In the prediction phase, the sub neural network system 33 can perform category prediction on the object images IM with unknown surface types by using the predictive model built. In some embodiments, the sub neural network system 33 performs percentile prediction on the object images IM according to surface defect categories, i.e., predicting the percentage of the possibility that each object image IM falls into the individual categories. Then, the sub neural network system 33 sequentially determines according to the percentage of the object image IM with respect to each surface type category whether the corresponding object 2 qualifies, and categories the object image IM to the normal group or the abnormal group according to whether the object 2 qualifies.

In some embodiments, the processor 15 includes one or more sub neural network systems 33. In the learning phase, the object images inputted into each sub neural network system 33 are known surface types, and after the object images with known surface types are inputted, each sub neural network system 33 performs deep learning according to the known surface types and the surface type categories (to be referred to as predetermined surface type categories) of the known surface types so as to build a predictive model (i.e., formed by a plurality of hidden layers sequentially connected, wherein each hidden layer includes one or more neurons, and each neural performs one determination item). In other words, in the learning phase, the object images with known surface types are used to generate determination items of each neural in the predictive model and/or adjust a weighting connecting any neurons, such that a prediction result (i.e., a predetermined surface type category outputted) of each object image matches a known surface type that is labeled as learned, thereby building a predictive model for identifying a surface type of an object.

For instance, the surface type can be exemplified by sand holes or air holes, bump marks or scratches, and an image block presenting different surface types can be an image block imaged with sand holes of different depths, an image block imaged without sand holes but with bump marks or scratches, an image block imaged with different levels of surface roughness, an image block imaged without any surface defects, an image block imaged with a surface type presenting different aspect ratios due to different contrast levels produced by illuminating the areas 21A to 21C by the detection light L1 having different light wavelengths, or an image block imaged with attachment of different colors. In the learning phase, the sub neural network system 33 performs deep learning according to the foregoing object images of different surface types, so as to build a predictive model for identifying various surface types. Further, the sub neural network system 33 can categorize object images having different surface types to generate different predetermined surface type categories in advance. Thus, in the prediction phase, after the object image IM is fed in, the artificial neural network system 30 (or each sub neural network system 33) executes the predictive model according to the object image inputted so as to identify in the object image the object image presenting the surface type of the object 2. The predictive model categorizes the object image of the surface type of the object according to a plurality of predetermined surface types.

For instance, taking one sub neuron network system 33 for example, the sub neuron network system 33 executes the foregoing predictive model according to the object image fed in, and the sub neuron network system 33 can use the object image IM of the object 2 to identify that the area 21A of a first object 2 contains sand holes and bump marks, the area 21B of a second object 2 does not contain any surface defects, the area 21C of a third object 2 contains sand holes and paint, and the surface roughness of the area 21A is greater than the surface roughness of the area 21C. Next, assuming that there are six categories of predetermined surface type categories, namely, containing sand holes or air holes, containing scratches or bump marks, having a high level of roughness, having a low level of roughness, having an attachment, and without any surface defects, the sub neuron network system 33 can categorize the object image IM of the first object 2 to the predetermined categories of containing sand holes or air holes and containing scratches or bump marks, categorize the object image IM of the second object 2 to the predetermined category of without any surface defects, categorize the object image IM the first object 2 to the predetermined category of having sand holes or air holes and the predetermined category of having an attachment, and categorize the object image IM of the third object 2 to the predetermined category of having non-uniform roughness. In another example, after the categorization, the sub neural network system 33 can further output the object images IM of the first object 2 and the third object 2 as the abnormal group according to the categorization result, and output the object image IM of the second object 2 as the normal group.

In some embodiments, the artificial neural network system 30 or any sub neural network system 33 of the present invention can be implemented by a computer program product, such that the artificial neural network-based method for selecting a surface type of an object according to any one of the embodiments of the present invention can be completed when a computer (i.e., a processor) loads and executes the program. In some embodiments, the computer program product is a non-transitory computer-readable storage medium, and the program above is stored in the non-transitory computer-readable storage medium and to be loaded by a computer (i.e., a processor). In some embodiments, the program above itself can be a computer program product, and is transmitted by a wired or wireless means into a computer.

What is claimed is:

1. An artificial neural network-based method for selecting a surface type of an object, suitable for selecting a surface type of a plurality objects, the method comprising:
   individually training a plurality of predictive models by performing surface type identification on a same plurality of object images to obtain a determination defect rate of each of the predictive models, wherein the plurality of object images are images of surfaces of some objects among the plurality of objects;
   cascading the plurality of predictive models in an order determined according to the respective determination defect rates of the predictive models into an artificial neural network system; and
   feeding object images of the remaining objects of the plurality of objects to the artificial neural network system, so as to select the surface type of the remaining objects.

2. The artificial neural network-based method for selecting a surface type of an object of claim 1, further comprising:
   transforming each of the object images to a matrix;
   wherein, one of the plurality of predictive models performs the surface type identification by using the matrix.

3. The artificial neural network-based method for selecting a surface type of an object of claim 1, further comprising:
   normalizing the plurality of object images; and
   transforming the plurality of normalized object images to the matrices;
   wherein, one of the plurality of predictive models performs the surface type identification by using each of the matrices.

4. The artificial neural network-based method for selecting a surface type of an object of claim 1, further comprising:
   respectively superimposing a plurality of object images of the same object into a plurality of initial images;
   wherein, one of the plurality of predictive models performs the surface type identification by using each of the initial images.

5. The artificial neural network-based method for selecting a surface type of an object of claim 1, further comprising:
   respectively superimposing a plurality of object images of the same object into a plurality of initial images; and
   transforming each of the initial images into a matrix;
   wherein, one of the plurality of predictive models performs the surface type identification by using each of the matrices.

6. The artificial neural network-based method for selecting a surface type of an object of claim 1, wherein each of the predictive models is implemented by a convolutional neural network (CNN) algorithm.

7. The artificial neural network-based method for selecting a surface type of an object of claim 1, wherein each of the object images is formed by combining a plurality of detection images.

8. The artificial neural network-based method for selecting a surface type of an object of claim 1, wherein the plurality of predictive models have different quantities of neural network layers.

9. The artificial neural network-based method for selecting a surface type of an object of claim 1, wherein the plurality of predictive models have different neuron configurations.

10. The artificial neural network-based method for selecting a surface type of an object of claim 1, further comprising:
    feeding the plurality of object images corresponding to the remaining objects to the artificial neural network system to perform the surface type identification.

11. The artificial neural network-based method for selecting a surface type of an object of claim 1, further comprising:
    selecting the remaining objects by prioritizing one among the predictive models that has a higher determination defect rate.

12. The artificial neural network-based method for selecting a surface type of an object of claim 1, wherein the plurality of object images correspond to surface types of the plurality of objects with a known defect rate, and one of the respective determination defect rates of the predictive models is higher than the known defect rate.

13. The artificial neural network-based method for selecting a surface type of an object of claim 1, further comprising:

performing a deep learning process by using different training conditions to build the plurality of predictive models.

14. The artificial neural network-based method for selecting a surface type of an object of claim 1, further comprising:

performing a plurality of deep learning processes to respectively build the plurality of predictive models.

15. The artificial neural network-based method for selecting a surface type of an object of claim 1, wherein the predictive models are cascaded in the order from highest determination defect rate to lowest determination defect rate.

16. The artificial neural network-based method for selecting a surface type of an object of claim 1, wherein the plurality of predictive models are respectively applied in sub neural network systems of the artificial neural network configured in stages according to the determination defect rate of the respective predictive model, such that each of the object images of the remaining objects fed into the artificial neural network is sequentially categorized as normal or abnormal in stages, with only object images categorized as normal by a previous stage being inputted to a subsequent stage.

17. The artificial neural network-based method for selecting a surface type of an object of claim 16, wherein the sub neural network systems are ordered from highest determination defect rate to lowest determination defect rate.

* * * * *